(12) United States Patent
Varilly et al.

(10) Patent No.: US 12,010,236 B2
(45) Date of Patent: Jun. 11, 2024

(54) BLOCKCHAIN-BASED CROWDSOURCING

(71) Applicant: Sony Group Corporation, Tokyo (JP)

(72) Inventors: Patrick Varilly, Stuttgart (DE);
Thomas Carette, Stuttgart (DE);
Conor Aylward, Stuttgart (DE); Rik Claesen, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 332 days.

(21) Appl. No.: 17/603,591

(22) PCT Filed: Apr. 23, 2020

(86) PCT No.: PCT/EP2020/061369
§ 371 (c)(1),
(2) Date: Oct. 14, 2021

(87) PCT Pub. No.: WO2020/216858
PCT Pub. Date: Oct. 29, 2020

(65) Prior Publication Data
US 2022/0200805 A1 Jun. 23, 2022

(30) Foreign Application Priority Data
Apr. 24, 2019 (EP) .................................. 19170850

(51) Int. Cl.
*H04L 29/06* (2006.01)
*H04L 9/32* (2006.01)
*H04L 9/00* (2022.01)

(52) U.S. Cl.
CPC .............. *H04L 9/3218* (2013.01); *H04L 9/50* (2022.05); *H04L 2209/56* (2013.01)

(58) Field of Classification Search
CPC ............. H04L 63/0435; H04L 63/0442; H04L 9/3218; H04L 9/3239; H04L 2209/56; H04L 9/50; G06F 21/64
See application file for complete search history.

(56) References Cited

U.S. PATENT DOCUMENTS

| 8,132,005 B2 * | 3/2012 | Tarkkala | H04L 9/3218 |
| | | | 713/168 |
| 9,495,668 B1 | 11/2016 | Juels | |
| 2011/0313820 A1 | 12/2011 | Biewald et al. | |
| 2020/0193425 A1 * | 6/2020 | Ferenczi | H04L 9/3239 |
| 2020/0351077 A1 * | 11/2020 | Krishnaswamy | H04L 9/3239 |

(Continued)

FOREIGN PATENT DOCUMENTS

| CN | 107342858 A | 11/2017 |
| WO | 2018/193355 A1 | 10/2018 |

(Continued)

OTHER PUBLICATIONS

NPL—ZKSnark explained (Year: 2023).*

(Continued)

*Primary Examiner* — Tri M Tran
(74) *Attorney, Agent, or Firm* — XSENSUS LLP

(57) ABSTRACT

A system comprising a distributed ledger (BC) configured to store a smart contract (SB) related to a problem statement (Z), the smart contract (SB) enabling a zero-knowledge proof (ZK) concerning the problem statement (Z).

19 Claims, 10 Drawing Sheets

---

In a setup stage a Requestor R sets up a smart contract SB for a problem statement Z, the smart contract SB containing a zero-knowledge proof ZK related to the problem statement Z, and , and provides a bounty B. — 201

In a crowdsourced solving stage, Solver SL finds solution S to problem statement Z and provides a proof of solution P and the solution to the smart contract SB. — 202

In the crowdsourced solving stage, smart contract with zkSNARK verifies solution S and automatically delivers bounty B and solution S, respectively. — 203

(56) References Cited

U.S. PATENT DOCUMENTS

2022/0321360 A1* 10/2022 Wahab .............. H04L 9/3218

FOREIGN PATENT DOCUMENTS

WO     WO-2018193355 A1 * 10/2018 ........... H04L 63/123
WO     WO-2018205729 A1 * 11/2018 ......... G06Q 20/3825

OTHER PUBLICATIONS

International Search Report and Written Opinion mailed on Jun. 8, 2020, received for PCT Application PCT/EP2020/061369, Filed on Apr. 23, 2020, 8 pages including English Translation.

Li et al., "CrowdBC: a Blockchain-based Decentralized Framework for Crowdsourcing", IACR, International Association for Cryptologic Research, vol. 20180711:232125, Available Online at: http://eprint.iacr.org/2017/444.pdf, Jul. 12, 2018, pp. 1-15.

Lu et al., "ZebraLancer: Private and Anonymous Crowdsourcing System atop Open Blockchain", IEEE, 38th International Conference on Disturbed Computing Systems, 2018, pp. 853-865.

Kurtulmus et al., "Trustless Machine Learning Contracts; Evaluating and Exchanging Machine Learning Models on the Ethereum Blockchain" Available Online at: https://algorithmia.com/research/ml-models-on-blockchain#protocol, 2018, pp. 1-17.

Ramamurthy, "Problem solving using Blockchain", Computer Science and Engineering, Apr. 12, 2018, 50 pages.

Lu Yuan et al: "ZebraLancer: Private and Anonymous Crowdsourcing System atop Open Blockchain", 2018 IEEE 38th International Conference on Distributed Computing Systems (ICDCS), IEEE, Jul. 2, 2018 (Jul. 2, 2018), pp. 853-865, XP033375937, DOI: 10.1109/ICDCS.2018.00087.

* cited by examiner

BLOCKCHAIN-BASED CROWDSOURCING

CROSS-REFERENCE TO RELATED APPLICATIONS

The present application is based on PCT filing PCT/EP2020/061369, filed Apr. 23, 2020, which claims priority to EP 19170850.2, filed Apr. 24, 2019, the entire contents of each are incorporated herein by reference.

TECHNICAL FIELD

The present disclosure generally pertains to the field of information processing, in particular to systems, devices, and methods for distributed computing and crowdsourcing of problems to potential solvers.

TECHNICAL BACKGROUND

Distributed computing is a field of computer science that studies distributed systems. In a distributed system, components are located on different computers, which communicate and coordinate their actions by passing messages to one another via a communication network. The components interact with one another in order to achieve a common goal.

Distributed systems enable crowdsourcing of problems. Crowdsourcing is an outsourcing model in which individuals or organizations obtain solutions to problems from a large and open group of e.g. internet users. Outsourcing certain complex tasks faces two challenges: recruitment and trust. To ensure correct recruitment of resources to perform given tasks, and to guarantee that an agreement is upheld by both parties is difficult. On the one hand the outsourcer (Requestor) has to engage with a limited set of providers (often a single one), increasing his operational risks associated to the solution not being delivered or being of bad quality. On the other side, the provider (Solver) has the risk that his customer not being willing or able to pay on delivery.

Typically, a company requiring certain developments either do it in-house or outsourced to a specialized company. When solved in-house, the quality of the solution is limited by the skill of the internal teams and/or the quality of their tools, as well as the resources available. When outsourced, there is significant friction in setting up initial contracts and there is an escrow problem: exchanging a solution for payment involves either giving both to a misted third party that mediates the exchange, or having one party send their solution/payment and trusting the counter-party to send the payment/solution, possibly with recourse to the legal system when trust is breached. Moreover, the limits in talents, tooling and resources are loosened by only a small amount.

Recent inventions in cryptography, like zero-knowledge proofs, have opened the possibility of one party (the Prover) convincing another party (the Verifier) that they know some secret information that satisfies an arbitrary set of constraints, without revealing to anyone anything about that information.

SUMMARY

It is generally desirable to provide enhanced systems and methods for distributed computing, in particular for crowdsourcing of problems.

According to a first aspect the disclosure provides a system comprising a distibuted ledger configured to store a smart contract related to a problem statement, the smart contract enabling a zero-knowledge proof concerning the problem statement.

According to a further aspect the disclosure provides a computer-implemented method comprising a Requestor requesting solutions to a problem statement, and a distributed ledger verifying a putative solution to the problem statement provided by a Solver using a zero-knowledge proof.

According to a further aspect the disclosure provides, an electronic device comprising circuitry configured to implement a zero knowledge scheme in a smart contract and to store the smart contract on a distributed ledger.

According to a further aspect the disclosure provides an electronic device comprising circuitry configured to create a proof of solution from a solution to a problem statement using a zero knowledge scheme implemented in a smart contract stored on a distributed ledger.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
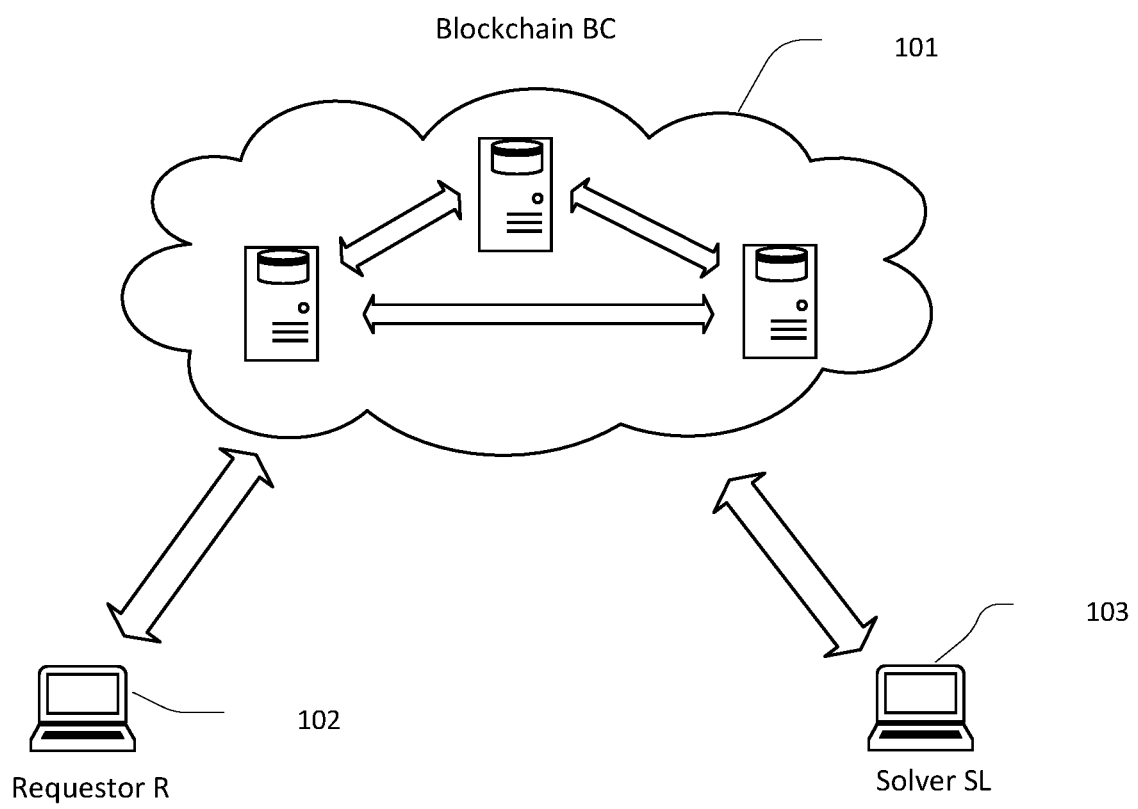
FIG. 1 describes an example of a system that is configured to host a smart contract for requesting solutions to a problem, verifying an answer and automating pay-out.

The embodiments described in more detail below disclose a system comprising a distributed ledger configured to store a smart contract related to a problem statement, the smart contract implementing a zero-knowledge proof concerning the problem statement.

The problem statement may for example refer to the outsourcing of a certain task. The task may be defined by a problem statement. An example of a well-posed problem is the problem of finding optimal solutions for protein folding. Other well posed problems are for example optimization problems like scheduling (trains, personnel, travel, supplier orders, etc.), packing (e.g., product boxes in delivery vans), or financial optimization.

According to embodiments, the problem statement is a formulation of the task expressed in human or machine-readable form. The problem statement may, for example, be defined such that a solution can be deterministically validated in polynomial time without recourse to external information and/or services. This is for example the case if the problem statement is in the complexity class NP.

A zero-knowledge proof provides a method by which one party (the prover, here in particular the Solver) can prove to another party (the verifier) that they know a specific solution, without conveying any information apart from the fact that they know the solution. Zero-knowledge proofs are used to prove possession of a solution without revealing the solution itself or any additional information. An embodiment of zero-knowledge proofs may be set up in such a way that no interaction is necessary between prover and verifier, called non-interactive zero-knowledge proofs.

The distributed ledger may be configured to receive a putative solution to a problem statement, and to verify the putative solution to the problem statement using a zero-knowledge proof.

The zero-knowledge proof may be based on a validation function which takes a putative solution and returns a score that represents the quality of the putative solution.

The zero-knowledge proof may be generated based on a computation object which is based on the validation function. The computation object is associated with the problem statement which is based on a validation function which takes a putative solution and returns a score that represents the quality of the putative solution. The validation function and the computation object may be computer implemented functions that take an input and return a number as an output. Based on the validation function or the computation object a zero-knowledge proof object may be created. This can be done for example by using standard non-interactive zero-knowledge-proof producing software like libsnark which is a library that implements the zkSNARK scheme.

The zero-knowledge proof may for example be implemented using a zkSNARK scheme. According to the embodiments, a fast computable non-interactive zero-knowledge proof scheme like zkSNARK (zero-knowledge Succinct Non-interactive Argument of Knowledge) may be used. Other zero-knowledge proof schemes may likewise be used in alternative embodiments.

According to the embodiments, a distributed ledger is con ed to store a smart contract related to a problem statement. A distributed ledger may be a database spread across database nodes that are located at multiple sites, regions, or participants. This may result in that there is no central administrator or centralized data storage needed to implement the database. The distributed ledger may for example be realized as a peer-to-peer network in which each peer provides resources, such as processing power, disk storage or network bandwidth, to other network participants, without the need for central coordination by servers or stable hosts. Any computing device such as a server, a personal computer, a laptop, a smartphone or the like may act as peer of the peer-to-peer network that implements the distributed ledger. Each of these computing devices that contributes to the distributed ledger provides circuitry configured to perform functionality of the distributed ledger, such as processors, memory, communication interfaces or the like.

The distributed ledger may for example be implemented as a blockchain. For example, a smart contract may be implemented on a blockchain. A blockchain provides a distributed ledger that can record transactions between two parties efficiently and in a verifiable and permanent ("immutable") way. A distributed ledger, in particular a blockchain may be a system comprising circuitry configured to host a decentralized database which stores a growing list of blockchain records, called blocks, which are linked using cryptography. Each block typically contains a cryptographic hash of the previous block, a timestamp, and transaction data. Multiple transactions are typically stored in a single block. A blockchain can be used for example as an open distributed ledger, where the blockchain is typically managed by a peer-to-peer network collectively adhering to a protocol for inter-node communication and creating and validating new blocks, for example a proof-of-work protocol. A blockchain provides a permanent (or "immutable") data storage in the sense that, once recorded, the data in any given block cannot be altered retroactively without alteration of all subsequent blocks, which requires consensus of the network majority. Here, immutability is strong in the sense there is no third party, or interest group able to mutate the "smart database" so as to violate the assumptions taken in the embodiments described below. A blockchain may in particular provide a trustless, immutable storage/computation which enables immutability of its storage, including data insert timestamps and the ability of the system to accept calls triggering strongly immutable computations on data stored in the database. Using a blockchain as platform for smart contracts may further provide a resilience/persistence of the system hosting the smart contracts (and in particular the smart bounty described in the embodiments below) during its validity.

The zero-knowledge proof may define a function configured to verify a proof of solution.

The zero-knowledge proof may define a function configured to build a proof of solution according to the zero-knowledge proof.

A zero-knowledge proof object may for example include a function buildProof configured to build a proof of solution and a function verifyProof configured to verify a proof of solution. The object may be a stand-alone program that can run these methods or be an input object to other software that is downloadable elsewhere.

The smart contract may define a function which is configured to be called on smart contract creation by a Requestor. The Initialize function may be configured to record a timestamp after which no further solutions will be accepted by the smart contract and before which Requestor cannot withdraw a bounty.

The smart contract may further define a function which is configured to be called only by a Requestor, and only after the deadline set by the initialize function has passed and no valid solution has been submitted.

The smart contract may further define a function which is configured to accept a proof of solution. This function may be configured to timestamp the received proof of solution in order to record the time and date of receipt of the proof of solution. A timestamp can be recorded for example after the proof of solution has been successfully implemented into a block of the blockchain.

The smart contract may further define a function which is configured to accept an encrypted solution as payload. This function may be configured to run a verifier function against a;proof of solution. This function may' further be configured to, if the verification result is positive, automatically transfer a bounty to the address of the function-caller, and to provide an encrypted solution to a Requestor.

The smart contract may further define a function which is configured to accept a new public key from Requester which replaces the previous public key. The public/private keys are generated in order to have a system where any person can encrypt a message using the Requester's public key, but the encrypted message can only be decrypted with the Requestor's private key. This may be achieved by using asymmetric cryptography systems like for example the RSA cryptosystem.

The distributed ledger may be configured to receive from a Requestor, a problem statement.

The distributed ledger may be configured to manage a bounty related to the problem statement. The distributed ledger may be configured to manage this bounty for example in the form of cryptocurrency. For instance, if a bounty is hosted on a blockchain, this cannot be hacked or shut down by anybody before the smart bounty is resolved or expired. Still further, a distributed ledger/blockchain provides the ability to provision a smart contract with a bounty so that it can only be claimed according to the smart contract methods described in the embodiments below in more detail.

The smart contract, may further define a function configured to provide a proof-generating-software to Solvers.

The smart contract may further define a function configured to provide an auxiliary application to Solvers which is configured to help a Solver to find an optimal solution to the problem statement.

The smart contract may further define a function configured to provide auxiliary data, available from the smart contract, such as the problem statement Z, a Requestor's public key, a proving key, and/or functionality to build a proof (which may be implemented in an accompanying proof-generating software).

The smart contract may further include a URL linking to a human- or machine-readable description of the problem statement, a package containing an accompanying proof-generating software, a proving key, and/or a auxiliary application provided by Requestor.

The system may further comprise a distributed file system for storing a solution to the problem statement.

The smart contract may further define a function which accepts an amount and date. The amount is blocked until the pledge date, in an account specific to the Requestor and from which individual bounties will be taken.

The smart contract may further define a function which accepts a bounty amount, a duration of validity, a public key, and a set of public inputs for a zero-knowledge proof.

The smart contract may further define a function which accepts status information and which returns a list of bounties filtered on their status information.

The smart contract may further define a function which deactivates the function for submitting a bounty.

The embodiments described below in more detail also disclose a computer-implemented method comprising a Requestor requesting solutions to a problem statement, and verifying a putative solution provided by a Solver SL using a zero-knowledge proof.

A Requestor is for example someone who intends to outsource a certain task and a Solver may be someone who intends to provide a solution to the task, The Requestor may describe the task by a problem statement.

Anybody interested in solving the problem may act as a Solver.

The Requestor may define a bounty (here also called "smart bounty") which is foreseen to be handed out to a Solver who found a valid solution to the problem statement. The bounty may for example be a certain amount of a cryptocurrency, i.e. as a digital asset designed to work as a medium of exchange that uses for example strong cryptography to secure financial transactions, control the creation of additional units, and verify the transfer of assets. A cryptocurrency may be decentrally stored and managed on a blockchain. Ownership to certain funds of a cryptocurrency may be proven by having the necessary private keys to move the funds.

The Requestor may send the bounty to a cryptocurrency wallet of the smart contract. A cryptocurrency wallet may be a device, physical medium, program or a service which, stores the private keys which are related to an amount of cryptocurrency and can be used to track ownership, receive or spend cryptocurrencies. The amount of cryptocurrency itself may not be in the wallet but decentrally stored in the blockchain BC, but the private keys to the amount of cryptocurrency may be stored in the cryptocurrency wallet. Therefore, after sending the cryptocurrency bounty B to the smart contact, only the smart contract is in the possession of the private keys necessary to move the bounty B.

The embodiments disclose a process where the Requestor sets up, for the problem statement, a smart contract containing the zero-knowledge proof for the problem statement.

According to the embodiments, a smart contract is a computer protocol intended to digitally facilitate, verify, or enforce the negotiation or performance of a contract. A smart contract allows the performance of credible transactions without third parties. These transactions are trackable and irreversible.

The embodiments disclose a smart contract that may has certain functions that can be called by anyone with the permission to call them, for example the Requestor.

Further, there may be a Cancel function which is configured to be called only by the Requestor, and only after the deadline set by the initialize function has passed and no valid solution has been submitted.

The embodiments also disclose a process where a solution may be stored on a distributed file system, like IPFS or BitTorrent. A distributed file system is a file system with data stored on a server but the data is accessed and processed as if it was stored on the local client machine. For example BitTorrent is a communication protocol for peer-to-peer file sharing which is used to distribute data and electronic files over the Internet. Another example is IPFS (InterPlanetary File System), which is a protocol and network designed to create a content-addressable, peer-to-peer method of storing and sharing hypermedia in a distributed file system.

Further, the embodiments describe a computer-implemented method comprising a Facilitator setting up a parameter dependent template, including a zkSNARK of a problem where a series of Requestors can submit specific public input parameters to the template, thereby defining the acceptance tests of the problem for which they would pay a certain bounty to get a solution. For instance, the travelling salesman problem can be solved for a set of coordinates to visit, but there is no generic solution for any set of coordinates. A template for the problem including a zkSNARK could be compiled to accept a set of coordinates to visit as public inputs and either a target cost which is provided by the Requestor, or the corresponding solution cost (to be used to select the best solution in a timed contest setup). Using this template including the zkSNARK, it may become possible to setup a smart contract to which a series of Requestors can submit specific public inputs defining the acceptance tests of the problem for which they would pay a certain bounty to get the solution.

Still further the embodiments also disclose an electronic device comprising circuitry configured to implement a zero knowledge scheme in a smart contract and to store the smart contract on a distributed ledger.

Still further the embodiments also disclose an electronic device comprising circuitry configured to create a proof of solution from a solution to a problem statement using a zero knowledge scheme implemented in a smart contract stored on a distributed ledger.

An electronic device may for example be a mobile or stationary electronic device, for example a tablet computer, a PC, a mobile phone, a smartwatch a wearable device, an activity tracker, an electronic glass or the like.

The circuitry of the electronic device may include a processor (e.g. a CPU), a memory (RAM, ROM or the like), a memory and/or storage, interfaces, etc. Circuitry may comprise or may be connected with input means (mouse, keyboard, camera, etc.), output means (display (e.g, liquid crystal, (organic) light emitting diode, etc.)), loudspeakers, etc., a (wireless) interface, etc., as it is generally known for electronic devices (computers, smartphones, etc.).

Embodiments are now described by reference to the drawings.

FIG. 1 describes an example of a system that is configured to host a smart contract SB for requesting solutions to a problem statement Z, verifying an answer and automating pay-out. The system comprises a distributed computation platform 101 which hosts a blockchain BC, a first client computer 102 which is operated by a Requester R, who intends to outsource a certain task, and a second client computer 103 which is operated by a Solver SL, who intends to provide a solution to the task. The distributed computation platform 101, the first client computer 102, and the second client computer 103 are interconnected by means of a computer network, e.g, the Internet, local area networks (LAN), UMTS/LTE, or the like.

Figure 2:
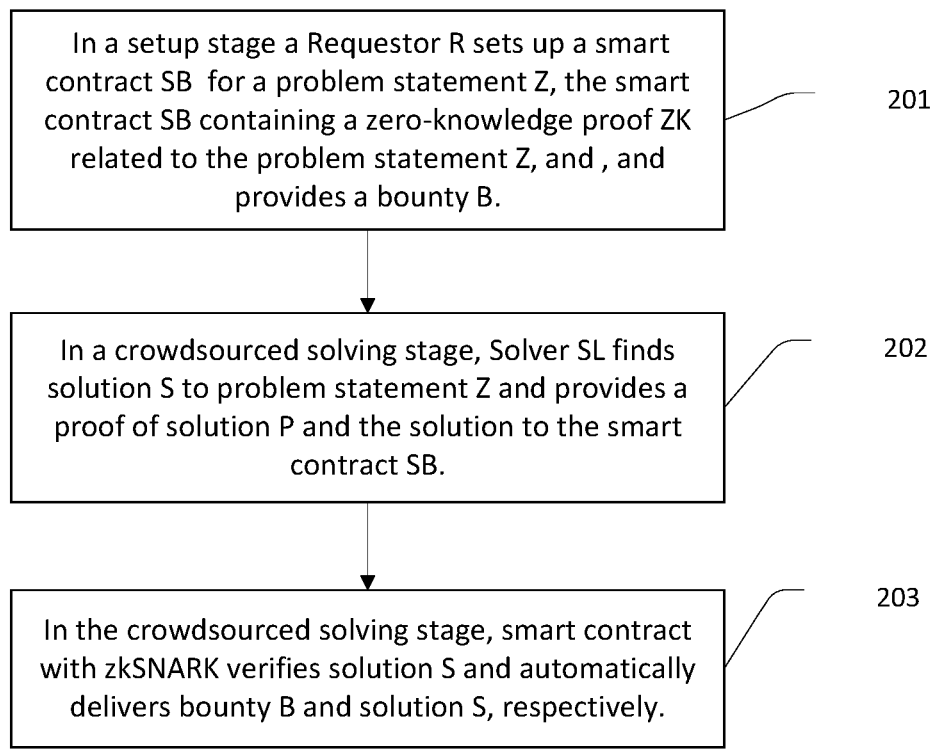
FIG. 2 shows a flow diagram visualizing a method of setting up a smart contract, including a bounty (B), for a solution to a problem Z, verifying an answer and automating pay-out of a bounty B.

FIG. 2 shows a flow diagram visualizing a process of setting up, on blockchain BC, a smart contract including a bounty B, for a solution S to a problem statement Z, and verifying an answer and automating a pay-out of a bounty B. At 201, a Requester R sets up, in a setup stage and by means of client computer 102 of FIG. 1, a smart contract SB for a problem statement Z, the smart contract SB containing a zero-knowledge proof ZK (e.g a zkSNARK scheme) related to the problem statement Z. Still further, at 201, in the setup stage, the Requester R provides a bounty B foreseen to be handed out to a Solver providing a solution S to the problem, statement Z. These aspects are described in more detail in FIG. 3 and the corresponding description, At 202, in a crowdsourced solving stage of FIG. 1, a Solver SL 103 finds a solution S to problem statement Z, and provides, e.g. by means of client computer 103 of FIG. 1, a prove of solution P and the solution S to the smart contract SB. This aspect is described in more detail in FIG. 4 and the corresponding description. At 203, the smart contract SB verifies the prove of solution P and the solution S and automatically delivers bounty B to Solver SL and solution S to Requestor R, respectively. This aspect is described in more detail in FIG. 5 and the corresponding description.

Figure 3:
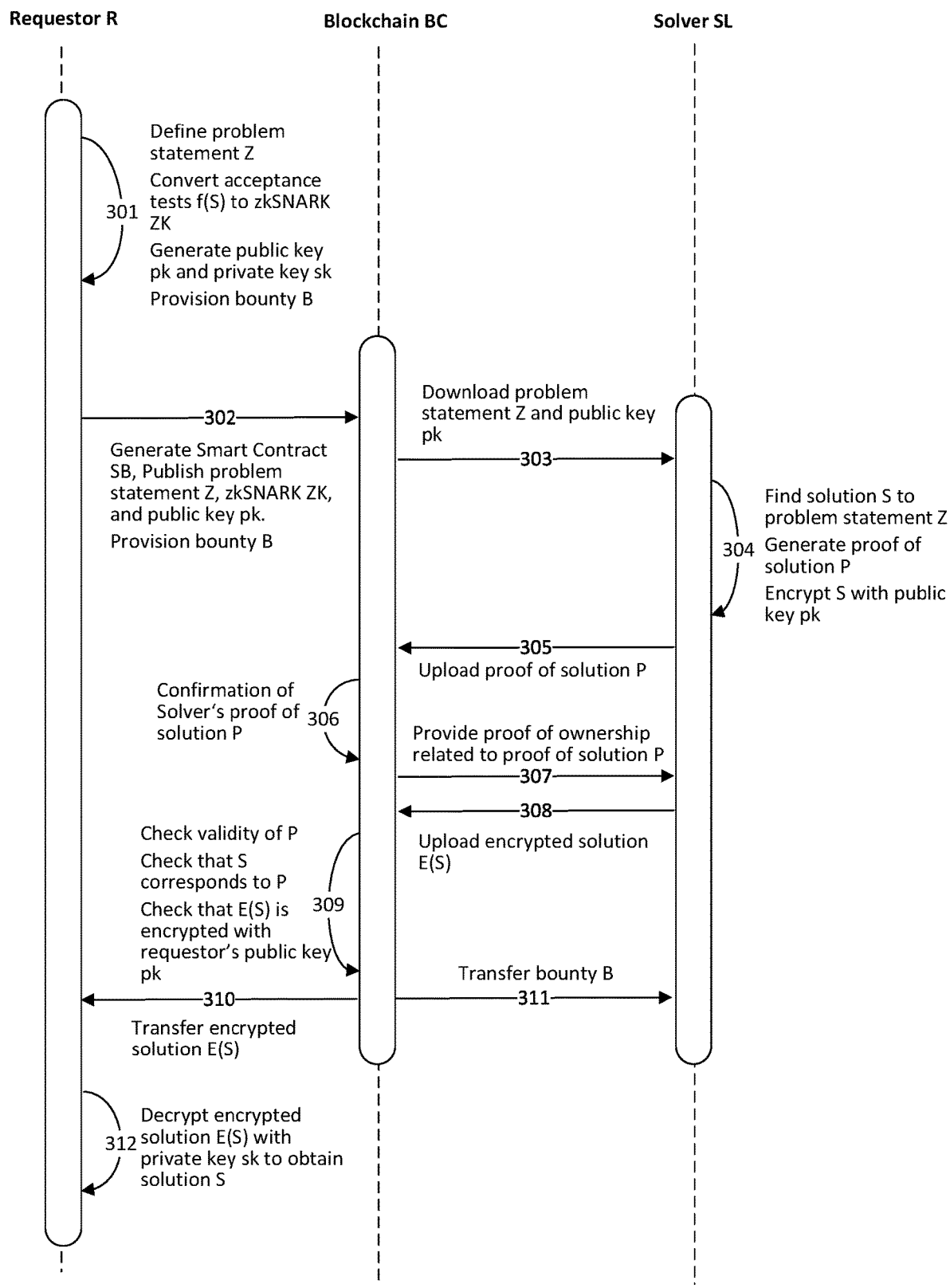
FIG. 3 shows in more detail an exemplifying communication flow during the process of FIG. 2.

FIG. 3 shows in more detail an exemplifying communication flow related to the process of FIG. 2. At 301, a Requestor R provides a computer-readable or human-readable problem statement Z and converts an acceptance test (see f(S) in FIG. 4) related to the problem statement Z into a zkSNARK object ZK. Further, he generates a keypair comprising a public key pk and a private key sk, and provisions a bounty B. At 302, the Requester R generates a smart contract for the problem statement Z on blockchain BC and publishes the problem statement Z, zkSNARK object ZK, public key pk and provisioned bounty B on a blockchain BC. At 303, a Solver SL downloads the problem statement Z and the Requestor's public key pk from the blockchain BC. At 304, the Solver SL finds a solution S to the problem statement Z, generates a proof of solution P which is signed with the Solver's identification (blockchain address of the Solver SL) key SA, and encrypts solution S with the Requestor's public key pk to obtain an encrypted solution E(S). At 305, Solver SL uploads the proof of solution P to blockchain BC. At 306, blockchain BC confirms the Solver's proof of solution P. At 307, Solver SL downloads, as an input confirmation that his proof of solution was recorded in the blockchain, a proof of ownership related to his proof of solution P. This proof of ownership is a signed transaction confirmed on the blockchain (similar to a digital receipt) that shows that Solver SL generated proof of solution P, when proof of solution P was confirmed in the blockchain and which address performed the transaction. This proof of ownership is used by the Solver's client to trigger the solution testing. After having received the proof of ownership, at 308, Solver SL uploads encrypted solution E(S) to blockchain BC. At 309, blockchain BC checks the validity of the Solver's proof of solution P, checks that solution S corresponds to proof of solution P and checks that E(S) is encrypted with requestor's public key pk. Thereby, the blockchain checks that the Solver shared the solution. At 310, the blockchain transfers the encrypted solution E(S) to Requestor R and, at 311, the blockchain transfers bounty B to Solver SL. At 312, Requestor R decrypts encrypted solution E(S) with private key sk to obtain solution S.

1. Setup Stage 1.1 Problem Definition by Requestor R

Process 301 of FIG. 3, namely the Requestor R 102 defining a well-posed problem statement Z, is described now in more detail. The Requestor defines the well-posed problem through a set of requirements. The problem statement Z may for example be formulated in human or machine-readable form and may be associated with a validation function f(S) ("acceptance tests") which takes a solution S and returns a Boolean (true or false) dependent on whether or not the input solution is a valid solution. The problem statement Z may be defined such that a solution S can be deterministically validated in polynomial time without recourse to external information and/or services. This is for example the case if the problem statement Z is in the complexity class NP (nondeterministic polynomial time) defined by computational complexity theory. Problems of the complexity class NP form the set of decision problems for which the problem instances, where the answer is "yes", have proofs verifiable in polynomial time. An introduction to NP type problems is for example given by Kleinberg, Jon and Tardos, Éva (2006) in Algorithm Design (2nd ed.), Addison-Wesley, p. 464.

An example of a well-posed problem statement Z is the problem of finding optimal solutions for protein folding.

This problem has been motivated thoroughly in the literature. For example, Cooper et. al. proposed to tackle the protein folding problem through crowdsourcing using an auxiliary application called "Foldit" which is implemented as a client application and which helps potential solvers to find solutions (Nature volume 466, 756-760 (2010)). That is, a Requestor R interested in finding optimal solutions for the problem of protein folding may distribute an auxiliary application which helps anybody interested in participating in the solving stage to find optimal solutions. The auxiliary application may use a protein model such as the wormlike chain or the freely joined chain to model the configuration of the protein. Using this auxiliary application, anybody can try to derive an optimal protein configuration which is represented by a respective series of vectors defining the position and orientation of the parts of the protein (amino acids).

In the chosen example of protein folding, the Requestor R is the entity which desires solutions to the protein folding problem. A putative solution S to the problem statement Z sought by Requestor R could be defined by an identification of the protein (defined e.g. by the chain of amino acids of the protein) for which a putative optimal configuration has been found and a series of vectors defining the position and orientation of the parts of the protein. In this example of protein folding, the validation function f(S) could be configured to take those vectors defining the position and orientation of the parts of the protein of the putative solution as input, to compute the total energy of the protein system, and to verify that it is below a threshold defined by Requestor R. The internal potential energy of the protein can be obtained from the chosen protein model, such as the wormlike chain model or the freely joined chain model, and the position and orientation of the parts of the protein.

As in the example of protein folding given above, many requirements are straight forward to specify and to check within a solution, but difficult to comply with. One class of such problems are optimization problems like scheduling (trains, personnel, travel, supplier orders, etc.), packing (e.g., product boxes in delivery vans), or financial optimization are examples of such problems. In such cases, the skilled person knows how to layout acceptance tests in requests for proposals and how to formulate a function f(S) which tests a putative solution.

In the example of protein folding given above, a solution is verified by the mathematical function f(S), which takes a solution S and returns a score, e.g. a Boolean (true or false) indicating whether the solution is valid or not, or, alternatively, a number indicating the quality of the solution.

The Requestor R advertises the problem statement Z widely. This advertisement may be in the form of the human or machine-readable description of problem statement Z. Advertising the problem may comprise any communication paths such as publishing the description of problem statement Z on a blockchain (e.g. within a smart contract), posting a description of problem statement Z on a website, advertising problem statement Z on a crowd sourcing platform, or in a newspaper. The object of advertising the problem statement Z is to make potential Solvers SL aware of the problem statement Z and to motivate them to provide a solution S to the problem statement Z, for example by announcing a bounty B related to solving the problem statement Z.

1.2 Bounty Definition

The Requestor R provides funds as incentive by defining a bounty which is made for example of a given amount of crypto currency, like Bitcoin or Ether (ETH) or the like. In the case that the solving of the problem is related to an auxiliary application, the Requestor might also use in-app currency to implement a bounty.

The Requestor R may for example create a digital wallet preformed with the bounty $B_r$. The funds can for example be realized as cryptocurrency like Bitcoin or Ether and they may for example be stored on blockchain BC in the form of a digital cryptocurrency wallet. The Requestor R transfers bounty B into a digital wallet which is attributed to the smart contract. The management of the bounty B may for example be such that access keys to the digital wallet are known only to the smart contract SB such that only the smart contract has the power of disposition over the bounty B until the deadline T of the smart contract SB is reached. For example, upon receiving a valid proof of solution and after receiving the solution from Solver SL, the smart contract may provide the access keys related to the digital wallet to the successful Solver.

There exist standard toolsets for generating cryptocurrency wallets. For example, etheremnjs-wallet is a wallet implementation that supports key creation and conversion between various formats.

The above example illustrates a potential use of a "one-shot" smart bounty. In alternative embodiments, it can be envisioned to provide a series of bounties. For example, in the scenario of protein folding, for different proteins and configurations, multiple bounties may be foreseen, such as proposed in the alternative embodiments described below in more detail.

1.3 Public and Secret Key Generation

The Requestor R may secure communication by means of a secret key. In this example standard asymmetric encryption algorithms, for example an RSA cryptosystem, are used. In case of standard asymmetric encryption algorithm, the Requestor R generates two keys, a public key pk and a secret key sk (also called private key). The public key is published by Requestor R and can be used by anybody to encrypt a message that can be decrypted by Requestor R using the corresponding secret key. These techniques are well known to the skilled person. In this way it can be guaranteed that a solution S is not disclosed to unauthorized parties.

1.4 Enabling Zero-Knowledge Proofs

As stated above, the Requestor's problem statement Z may be related to a validation function f(S) which takes a solution S in a given format and returns a Boolean (true or false) and which allows zero-knowledge proofs related to the problem statement Z.

The validation function f(S) may for example be implemented in a zero-knowledge proof scheme. A zero-knowledge proof provides a method by which one party (here Solver SL) can prove to another party (here the smart contract) that they know a specific solution S to the problem statement Z, without conveying any information apart from the fact that they know the solution S. Here, a fast computable non-interactive zero-knowledge proof scheme like zkSNARK (zero-knowledge Succinct Non-interactive Argument of Knowledge) is used. Other zero-knowledge proof schemes may likewise be used in alternative embodiments. Using a zero-knowledge proof such as zkSNARK allows the Solver S to prove possession of a solution S without revealing the solution itself or any additional information.

To build a zkSNARK object ZK for problem statement Z, the Requestor R prepares a computation object $C(f, \vec{x}, \vec{y})$, where f is the validation function f(S) ("acceptance tests") which takes a potential solution S and returns true or false dependent on whether or not S solves problem statement Z, and where $\vec{x}$ are public inputs and $\vec{y}$ are private inputs.

The public inputs $\vec{x}$ of computation object C(f, $\vec{x}$, $\vec{y}$) comprise the Requestor's public key pk, an encrypted solution E(S) (also called "ciphertext" of solution S), an identification key SA of Solver SL (e.g. a blockchain address or wallet address). The identification key SA of the Solver SL is provided to computation object C(f, $\vec{x}$, $\vec{y}$) in order to enable a signing of the proof of solution P by the Solver SL and therefore mitigate the risk of theft of the solution (S). The proof of solution P should be signed with the same blockchain address SA like the address from which to proof of solution is uploaded to the blockchain (see section 2.2 Proof registration). As private input $\vec{y}$ the computation C(f, $\vec{x}$, $\vec{y}$) takes a putative solution S encoded as a byte stream.

According to this embodiment, the computation object C(f, $\vec{x}$, $\vec{y}$) reduces the inputs to a single Boolean output (true/false), with the value of true if the putative solution S is valid and if the encrypted solution E(S) (ciphertext) is encrypted with the public key pk of Requestor R. Here, the computation object C(f, $\vec{x}$, $\vec{y}$) checks if the putative solution S is valid by means of function f(S) which returns true if the putative solution S is valid and false otherwise. Further, the computation object C(f, $\vec{x}$, $\vec{y}$) can validate if the encrypted solution E(S) is encrypted with the public key pk of Requestor R. This can be achieved by the computation object C(f, $\vec{x}$, $\vec{y}$) by using public key pk to encrypt the putative solution S and compare the result with encrypted solution E(S).

No condition is imposed to the Solver's identification key SA. Its sole purpose is to enable signed-proofs. This means that the computation C(f, $\vec{x}$, $\vec{y}$) may resolve to true irrespective of the provided identification key SA. The computation C(f, $\vec{x}$, $\vec{y}$) which is transformed to a zkSNARK object and the functions of the zkSNARK that create and verify the proof P (buildproof and verifyProof), as described below, use the Solver's identification key SA in order to sign the proof of solution P and verify the signing. The Solver's identification key SA is the blockchain address to which, the bounty will be paid in case that the solution is valid.

The computation object C(f, $\vec{x}$, $\vec{y}$) is transformed into a zkSNARK object ZK using standard zero-knowledge proof toolsets such as ZoKrates on Ethereum, or using open source libraries, e.g., libsnark.

Figure 3B:
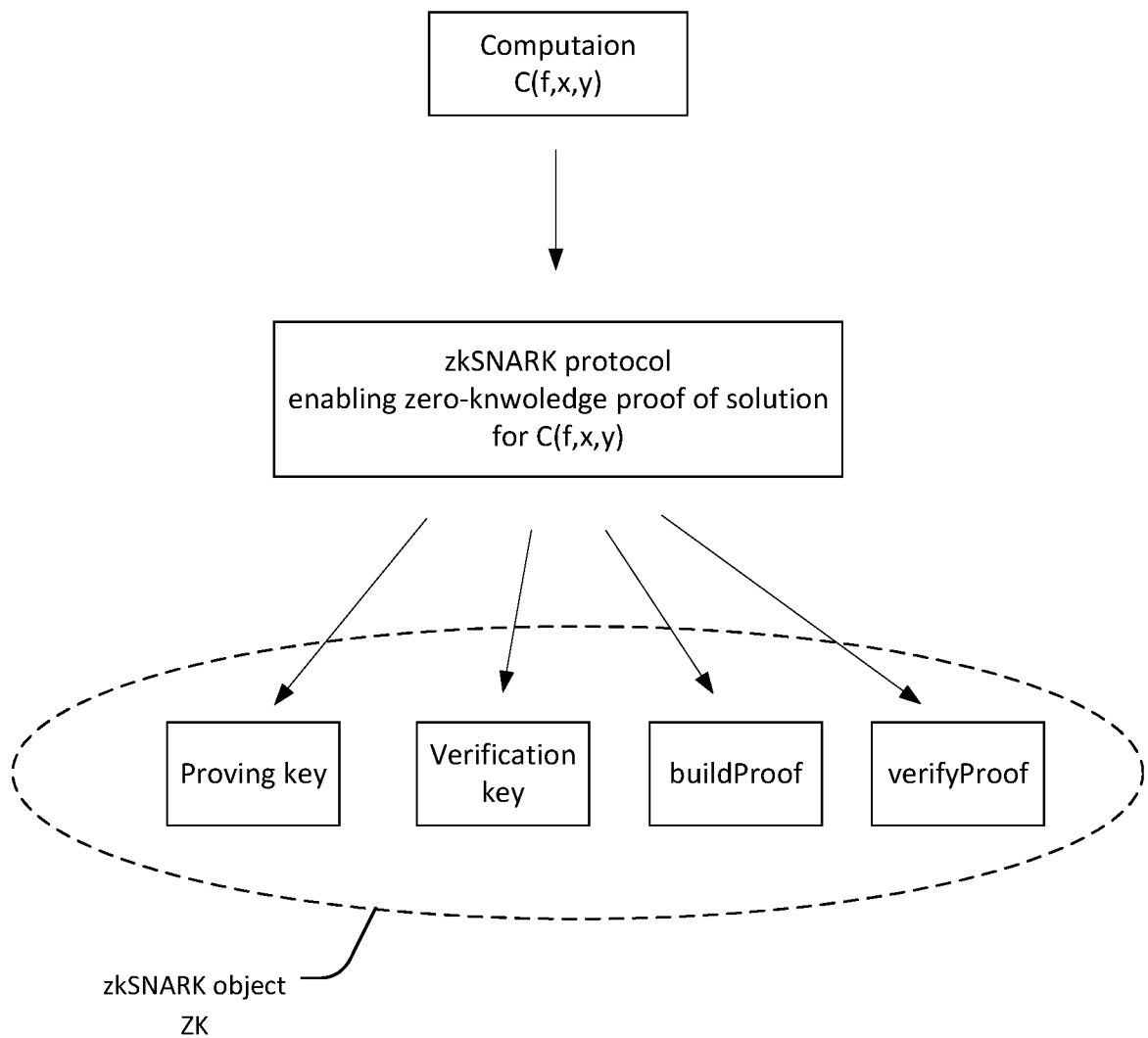
FIG. 3b schematically shows the transformation of a computation $C(f, \vec{x}, \vec{y})$ into a zero-knowledge provable format using a zkSNARK protocol.

FIG. 3b schematically shows an example of the transformation of a computation C(f, $\vec{x}$, $\vec{y}$) into a zero-knowledge provable format using a zkSNARK protocol. From the computation object C(f, $\vec{x}$, $\vec{y}$) and in order to enable zero-knowledge proofs, Requestor R builds a zkSNARK object ZK. The Requestor R may for example run setup stages of a zkSNARK for this computation object C(f, $\vec{x}$, $\vec{y}$) to produce the zkSNARK object ZK, comprising a proving key and verification key, and an accompanying proof generating function buildProof and a proof validation function verifyProof. That is, the resulting zkSNARK object ZK provides two methods: one for building a proof (buildProof), and the other to verify a proof (verifyProof). The zkSNARK object ZK may be executable off-chain, that means it may be executable on a local client computer and not just on the blockchain, and buildProof may not be executed through a transaction but locally on a client computer (even though verifyProof is executed by the smart contract).

The proving key and the verification key are used by buildProof and, respectively, verifyProof to implement computation object C(f, $\vec{x}$, $\vec{y}$). The proving key enables generating zero-knowledge proofs P from putative solutions S provided by Solvers SL, and, respectively, the verification key enables validations of generated proof of solutions P.

buildProof is provided to Solver SL and is foreseen to be called by a Solver SL who found a putative solution SL to generate a proof of solution P based on the putative solution S. buildProof requires the public and private inputs $\vec{x}$, $\vec{y}$ (public key pk, encrypted solution E(S), Solver's blockchain address SA), the proving key, and a solution S. buildProof returns a proof of solution P. buildproof can for example be implemented as a stand-alone software ready-to-use by the Solver SL to generate the proof of solution P or it can be a data object that is used in combination with a proof-generating software library to generate the proof of solution. buildproof is foreseen to be distributed to anybody who wants to try to find solutions to the problem statement Z defined by Requestor R. A Solver SL who found a solution S will use this accompanying proof-generating software to generate a proof of solution P for his solution S.

verifyProof requires the public inputs $\vec{x}$ (public key pk, encrypted solution E(S), Solver's blockchain address SA), the verification key, and a proof generated with buildProof. verifyProof returns a Boolean variable which evaluates to true if and only if the encrypted solution E(S) is encrypted with the public key pk and the proof of solution P provided as input is affirmed to the positive.

1.5 Smart Contract Generation

Following this generation of the zkSNARK object ZK, the Requestor R creates a smart contract SB that implements the logic around the zkSNARK object ZK. Requestor R publishes this smart contract SB on a blockchain BL, prefunded with a bounty B.

There exist standard tools for interacting with a blockchain to setup and manage smart contracts. For example, libraries like ether.js, truffle, openzeppelin-solidity, and the like provide toolboxes for generating smart contracts and for registering them on a distributed ledger/blockchain.

The smart contract SB has its own blockchain address. Every communication between the smart contract SB and for example the Solver SL may be viewed as a transaction performed between the blockchain address of the smart contract SB and Solvers blockchain address SA (identification key). For example every function call to the smart contract SB from the Solver SL (for example RegisterProofOfSolution described in section 2.2 below) is a transaction between the Solvers blockchain address SA and the smart contract address. Therefore the address from which the function call originates may be described as caller address. Those transactions may be stored (recorded) permanently on the blockchain, together with the data (function inputs) that were sent by making the call.

According to an embodiment, the smart contract code may be implemented by software code which provides the following exemplifying functions which define transactions on the zkSNARK object ZK:

Initialize:
Initialize is called on smart contract creation by Requestor R. Initialize records a "deadline" timestamp after which no further solutions will be accepted by smart contract SB and before which Requestor R (who is the owner of smart contract SB) cannot withdraw his funds.

FetchAuxiliaryData:

FetchAuxiliaryData is called by the Solver SL. By FetchAuxiliaryData the Solver SL may retrieve auxiliary data available from the smart contract, such as the problem statement Z defined by Requestor R, the Requestor's public key, the proving key, the buildproof function, and/or potentially an accompanying proof-generating software, or the like. For example, with FetchAuxiliaryData a Solver might retrieve a stand-alone software application which implements the buildproof function and which is foreseen to be used by the Solver SL to generate a proof of solution. If auxiliary software is provided by Requestor R (for example software which helps a Solver to determine optimal protein configurations), a Solver may retrieve also such auxiliary software by calling the FetchAuxiliaryData function.

In addition or alternatively, the smart contract may further provide a URL linking to a human- or machine-readable description of the problem statement and desired solution and a package containing the accompanying proof-generating software (respectively the proving key), and possibly any auxiliary applications provided by Requestor R for assisting Solvers in the solving stage. If not included in the smart contract, such information is assumed to be publicized widely to potential Solvers via other means such as publication, on a website, or the like.

RegisterProofOfSolution:

RegisterProofOfSolution is to be called by a Solver SL who claims to have achieved a putative solution S to problem statement Z. If called before the time limit by a Solver SL, RegisterProofOfSolution accepts a zkSNARK proof of solution P provided by Solver SL, signed by his blockchain address SA. By calling the RegisterProofOfSolution function the uploaded proof of solution P gets timestamped on the blockchain. Further, the call of the RegisterProofOfSolution function itself, constitutes a transaction between the smart contract blockchain address and the Solvers blockchain address SA and this transaction itself is recorded in the blockchain. This transaction, or the record of this transaction in the blockchain, can be described as a proof of ownership (digital receipt) that shows from which address the RegisterProofOfSolution was called (i.e. from which address the proof of solution P was uploaded) and at which time the proof of solution P was confirmed in the blockchain. This proof of ownership (record in the blockchain) may be sent as an excerpt from a blockchain explorer, that is recording every single transaction within the blockchain (like, for example, etherscan.io for the ethereum blockchain), to the Solver SL. If multiple putative solutions S are claimed by multiple Solvers SL, this time stamp enables a distribution of the bounty according to priority.

The proof of solution P can for example be, stored on the blockchain BC into a next block that is generated by the blockchain BC. In this way, the proof of solution will be immutably timestamped on the blockchain BC.

TestSolution:

TestSolution is called by a Solver SL who claims to have achieved a solution and has already registered a proof of solution P using RegisterProofOfSolution. When the TestSolution procedure is called by a Solver SL (the call is made from the Solvers address), the smart contract SB checks if the latest RegisterProofOfSolution call came from the same Solver SL (same address) and takes the proof of solution P that was uploaded during this call. If called before the time limit, TestSolution accepts an encrypted solution E(S) as payload and runs the zkSNARK verifier function verifyProof against the last proof of solution P registered from the caller's address using the public key pk active at the time of the proof registration and the provided encrypted payload as public inputs. The TestSolution function can verify a solution S if it finds a valid corresponding proof of solution P uploaded at the RegisterProofOfSolution step. TestSolution returns a boolean variable BOOL. BOOL evaluates to true if and only if the encrypted solution E(S) is encrypted with the public key pk and the proof of solution P which has been previously registered by the caller using RegisterProofOfSolution is affirmed to the positive. If the verification result is positive, TestSolution transfers the bounty B to the address of function-caller (solver SL). Requestor R can then retrieve the encrypted solution E(S) uploaded by Solver SL using standard means (e.g., blockchain monitoring, events, on-contract storage, etc.) and decrypt it with his private key sk.

The following extra helper functions may be included into the smart contract:

ChangeKeys:

ChangeKeys is called by the Requestor R e.g. in case of loss or theft of the Requestor's private key pk. ChangeKeys accepts a new public key pk from Requestor R which replaces the previous public key. After invoking ChangeKeys, the new public key must be used by Solvers to encrypt all putative solutions in the future.

If ChangeKeys is invoked by the Requestor R between a proof registration and the submission of the corresponding solution E(S), this could cause a denial of bounty. To avoid this, TestSolution may optionally be configured to check the submitted solution E(S) using the Requestor's current encryption key and in addition using the Requestor's previous encryption key.

Cancel

Cancel can only be called by Requestor R and only after the deadline set by Initialize has passed and no valid solution has been submitted. Cancel returns the bounty B to Requestor R and self-destructs smart contract SB.

It should be noted that the above setup scheme preferably allows to avoid zkSNARK trusted setup problems. Typically zkSNARK requires a so called "trusted setup" phase. A given zkSNARK is either specific to a particular computation, or if generic, is very inefficient. For every specific zkSNARK, a one-time trusted setup phase is typically run, involving secret information that should be destroyed after the setup stage. If not destroyed, anyone with access to the secret information could create a "fake" proof. In the problem setup stage described above, the Requestor R runs the trusted setup. Thus, only the Requestor could in principle make fake proofs as a way to cancel a bounty. But then to avoid any loss of reputation, the Requestor would have to also upload a corresponding believable cyphertext which correspond to the fake proof.

1.6 Exemplary Process Flow During Setup Stage

Figure 4:
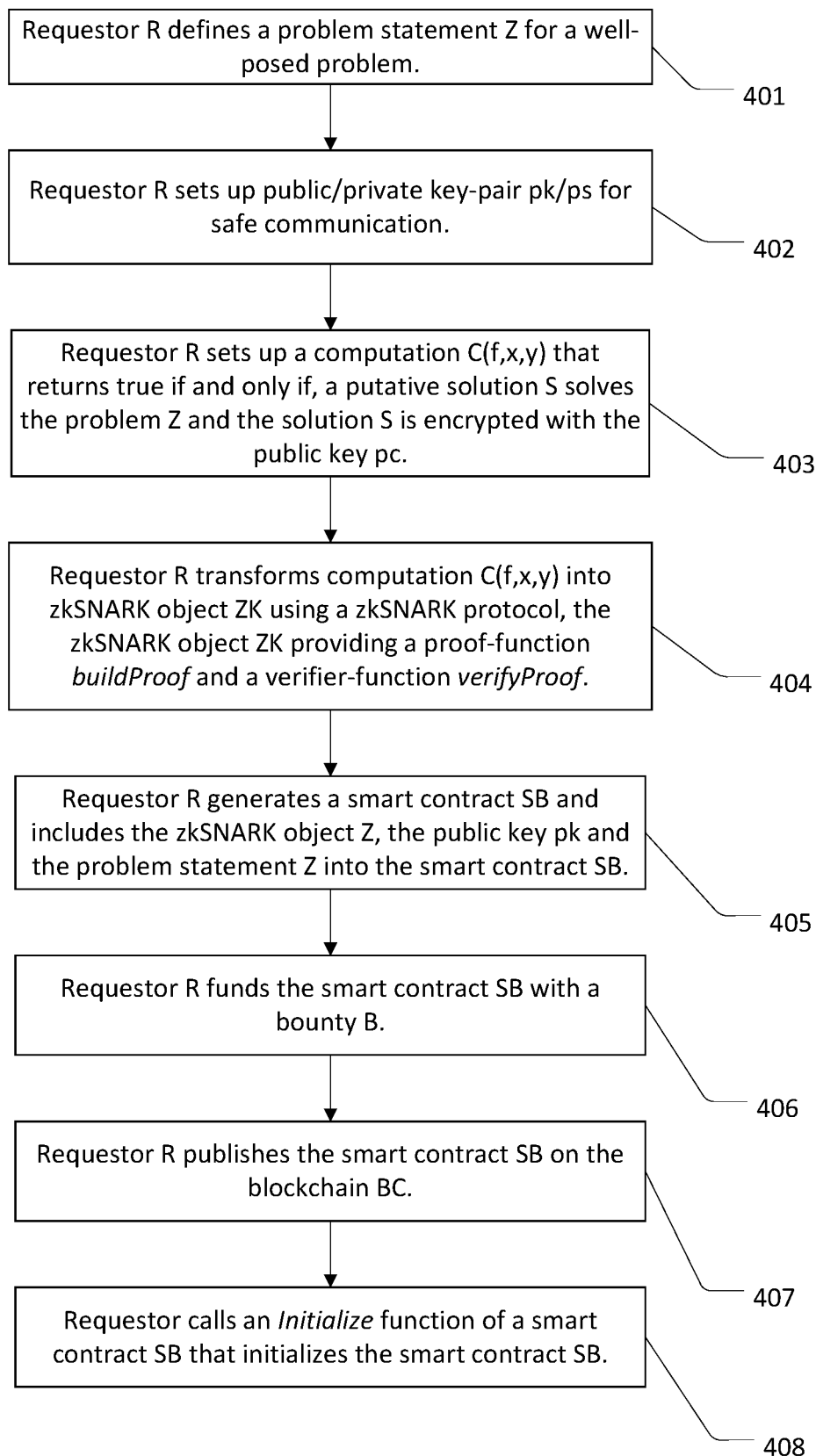
FIG. 4 shows a flow diagram visualizing a method of a Requestor R setting up a smart contract SB containing a zkSNARK object ZK for a problem Z (201 in FIG. 2)

FIG. 4 shows a flow diagram visualizing in more detail the setup stage in which a Requestor R sets up a smart contract SB (see 201 in FIG. 2). At 401, the Requestor R defines a problem statement Z for a well-posed problem. At 402, the Requestor R sets up a public/private key-pair pk/sk for safe communication. At 403, the Requestor R sets up a computation C(f, $\vec{x}$, $\vec{y}$) that returns true if and only if, a putative solution S solves the problem statement Z and if the solution S is encrypted with the public key pk. At, 404, the Requestor R transforms the computation C(f, $\vec{x}$, $\vec{y}$) into a zkSNARK object ZK using a zkSNARK protocol, the zkSNARK object ZK providing a proof-function buildProof and a verifier-function verifyProof. At 405, the Requestor R 102 generates a smart contract SB and includes the zkSNARK object ZK, the public key pk and the problem statement Z into the smart contract SB. At 406, the Requestor R funds the smart contract SB with a bounty B. At 407, the Requestor R publishes the smart contract SB on a blockchain BC. At 409, the Requestor R calls an Initialize function of the smart contract SB that initializes the smart contract SB.

2. Crowdsourced Solving Stage

Once the Requestor R has provided his problem statement and has advertised the problem statement and has set up a corresponding smart contract SB on a blockchain BL, by means of the smart contract SB, anyone who has a putative solution S can provide prove to Requestor R that he is in possession of a valid solution S.

Anyone can play the role of a Solver. The crowdsourcing principle of this embodiment provides low barrier to entry. Anyone in the world can propose a solution to the problem statement Z posed by Requestor R. Hence, Requestor R has access to a collective intelligence and resources of a nearly limitless talent pool.

Anyone interested in participating in the crowdsourced solving stage will retrieve the human or machine-readable problem statement that the Requestor advertised, e.g. on a crowdsourcing platform. By calling the FetchAuxiliaryData function from the smart contract SB the Solver SL retrieves the problem statement, the proving key and an accompanying proof-generating software (that implements the buildproof function of the zero-knowledge scheme). Using the proof-generating software, the Solver SL who has found a putative solution S creates a proof of solution P, which is a proof of its knowledge, with a proof function buildProof and the proving key. If auxiliary software is provided by Requester R, this auxiliary software may also be retrieved by calling the FetchAuxiliaryData function.

2.1 Proof Generation

The Solver SL retrieves the proving key and the proof-generating software, respectively any other implementation of the buildproof function by calling the FetchAuxiliaryData function. As stated above, the buildproof function can be implemented as a stand-alone software ready-to-use by the Solver SL to generate the proof of solution or it can be an object that is used in combination with a proof-generating software library to generate the proof of solution.

Upon finding a putative solution S, the Solver creates a proof of solution P with the proof generating function buildProof and the proving key. The proof generating function buildProof provided by a zero-knowledge proof scheme generates the proof of solution P which provides a method by which the Solver SL can prove that he knows a specific solution S to the problem statement Z, without conveying any information apart from the fact that they know the solution S. Here, for example a fast computable non-interactive zero-knowledge proof scheme like zkSNARK (zero-knowledge Succinct Non-interactive Argument of Knowledge) is used. Other zero-knowledge proof schemes may likewise be used in alternative embodiments. Using a zero-knowledge proof such as zkSNARK allows the Solver S to prove possession of a solution S without revealing the solution itself or any additional information.

2.2 Proof Registration

Solver SL calls the RegisterProofOfSolution function from the smart contract SB to upload the proof of solution P to the blockchain BC. When the TestSolution method is called by a Solver SL (the call is made from the Solvers address SA to the smart contract blockchain address), the smart contract SB checks if the latest RegisterProofOfSolution call came from the same Solver SL (same address) and takes the proof of solution P that was uploaded during this call. Therefore, the TestSolution function cannot verify a solution S if it doesn't find a valid corresponding proof of solution P uploaded at the RegisterProofOfSolution step. As described above, this call of the RegisterProofOfSolution function (from the Solver blockchain address SA to the smart contract blockchain address) is a transaction between those two addresses. This transaction is recorded permanently on the blockchain, together with the function inputs (proof of solution P) that was sent when making the function call. The record in the blockchain is called the proof of ownership that shows that the Solver SL uploaded the proof of solution P. Since the proof of solution is signed with the same blockchain address SA, the proof of ownership of the proof of solution confirms that Solver SL generated proof of solution P, when proof of solution P was registered in the blockchain BC and which blockchain address performed the transaction. The proof of ownership (record in the blockchain) may be sent as an excerpt from a blockchain explorer, which is recording everything single transaction within the blockchain (like, for example, etherscan.io for the ethereum blockchain), to the Solver SL. The address that is shown in the proof of ownership (that is the blockchain address from which the RegisterProofOfSolution function call originated) and the blockchain address that was used for the signing of the proof of solution P at its creation, that is the Solvers identification key SA are the same. To this blockchain address the bounty will be paid in case that the solution is valid.

2.3 Solution Submission and Verification

After receiving a proof of ownership related to proof of solution P as a confirmation of the proof of solution P by the smart contract SB in the blockchain BC, the Solver SL encrypts solution S with the current public key pk of the Requestor obtained from the smart contract SB to obtain an encrypted solution E(S).

Solver SL then submits the encrypted solution E(S) to blockchain BC using the TestSolution function. The TestSolution function will run the verifier function verifyProof from the zkSNARK object ZK using the proof of solution P, the public input and the verification key, stored within the zkSNARK object, as inputs. If called before the time limit, TestSolution runs the zkSNARK verifier function verifyProof against the last proof of solution P registered from the caller's address using the public key pk active at the time of the proof registration and the provided encrypted payload as public inputs. TestSolution returns a Boolean variable which evaluates to true if and only if the encrypted solution E(S) is encrypted with the public key pk and the proof of solution P which has been previously registered by the caller using RegisterProofOfSolution is affirmed to the positive If the TestSolution function evaluates to true, that is if the solution proof of solution P was valid and the encrypted solution E(S) was encrypted with the public key pk of Requestor R, the TestSolution function will send the bounty B to the Solver's blockchain address SA and the encrypted solution E(S) to the Requestor R.

That is, once Solver SL sends a valid encrypted solution E(S) with accompanying proof of solution P, the nature of the blockchain and smart contract automatically results in that the solution is transmitted to and accepted by the Requestor R and that the corresponding payout will be made to Solver SL. The small window of opportunity for the Requestor to sabotage the process is addressed in the "two-step verification" protocol above, where it is described that the Solver SL first sends P to the blockchain and saves a proof that P belongs to him and then secondly the Solver SL uploads the solution and triggers the TestSolution method. Escrow problems are thus avoided.

Since verification and payout is performed by a smart contract, the total time between submitting a valid solution and receiving a payout is measured in seconds to minutes, not hours or days.

The solving stage described in this embodiment is decentralized. Since no trusted third party is involved in verifying solutions and distributing payouts, any associated fees are obviated.

The scheme provides transparency to the involved parties, Requestor R and Solver SL. Payout is known by all participants ahead of time, and everyone can detect when a problem has been submitted and when the bounty has been claimed successfully.

The solution's ownership is secured against solution theft to the extent that the used blockchain is. Indeed, stealing the solution S would require stealing a solution as soon as it would be uploaded on the blockchain and recreate the blockchain since the proof registration faster than the main chain to be opted by the network. This risk is further mitigated by requiring the Solver's address as public input as only the Requestor would be able to decrypt the Solver's solution and recreate a valid proof.

In the example of protein folding, anyone interested in trying to find an optimal protein configuration might for example use the auxiliary application provided by Requestor R. Upon finding a putative optimal fold of a particular protein, the Solver would press a button of the auxiliary application submitting his solution. The whole process of communicating the solution and receiving, the bounty as described above could be automated by the auxiliary application provided by the Requestor R, making the use of the smart contract logic implemented on a blockchain as described above. If, in this way, the Requestor R integrates the smart contract logic into an auxiliary application, the blockchain and smart contract scheme remains totally transparent to the Solvers SL, except for the eventual use of cryptocurrency to transfer the bounty.

In the case of multiple submissions, the Requestor R may decide to either use the time of the proof registration or of the solution upload as the reference to arbitrate prior submission. In typical blockchains, transactions are bundled into blocks arbitrarily, so there is a priori no order in them but they are valid as a whole. In the case where two submissions end up in the unconfirmed submission at the same time, the Requestor R can decide how to arbitrate it by customizing the TestSolution function.

2.3 Exemplary Process Flow During Crowdsourced Solving Stage

Figure 5:
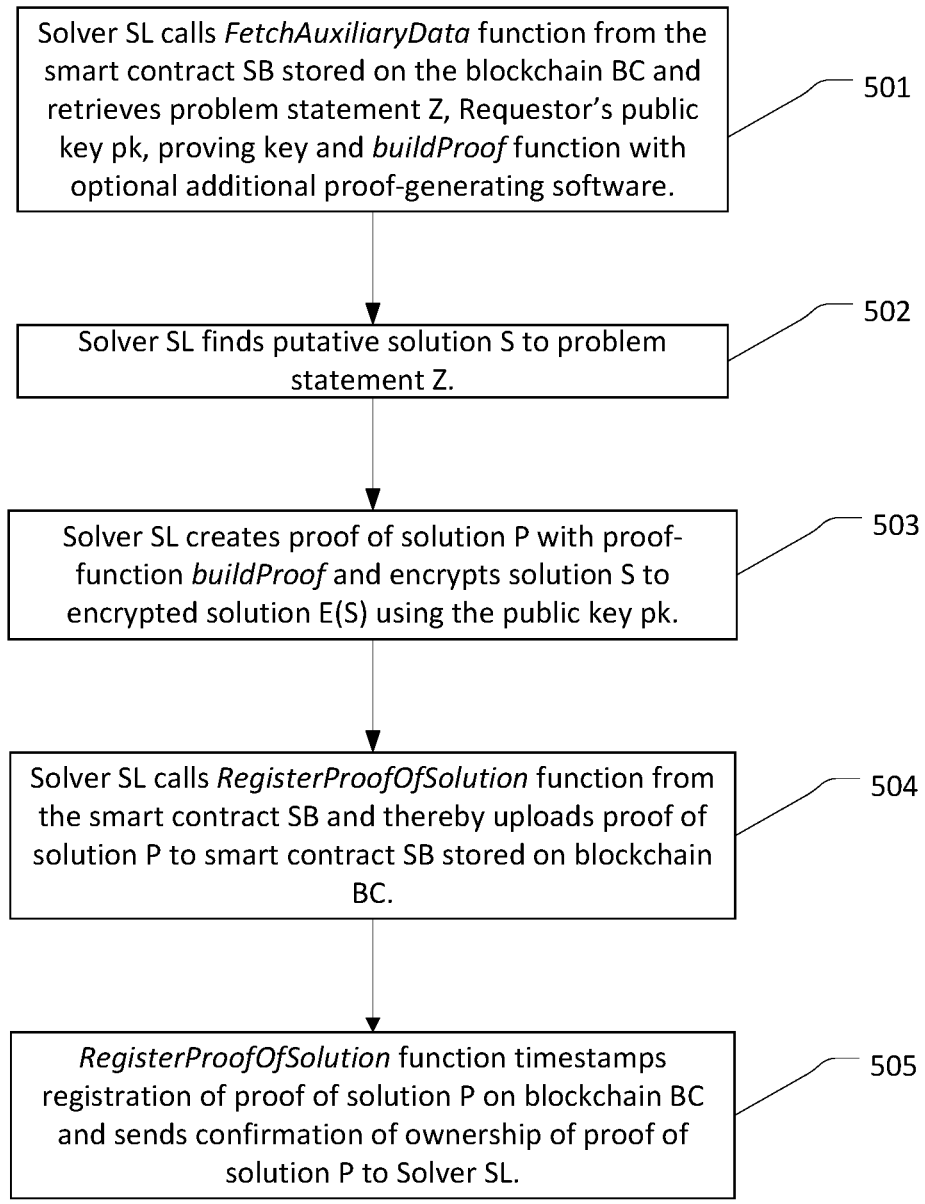
FIG. 5 shows a flow diagram visualizing a method of Solver SL finding a solution S to a problem Z and transforming the solution S into zkSNARK readable format (202 in FIG. 2)

FIG. 5 shows a flow diagram visualizing a method of Solver SL finding a solution S to a problem statement Z and transforming the solution S into a zkSNARK readable format (202 in FIG. 2). At 501, a Solver SL calls the FetchAuxiliaryData function from the smart contract SB stored on the blockchain BC and retrieves a problem statement Z, the Requestor's public key pk., a proving key and proof-generating software (which impelements the build-Proof functionality of the zkSNARK object). At 502, a Solver SL finds a putative solution S to the problem statement Z. At 503, the Solver SL creates a proof of solution P with the proof-generating software (respectively function buildProof) and encrypts a solution S to an encrypted solution E(S) using the public key pk of Requestor R. At 504, Solver SL calls the RegisterProofOfSolution function from the smart contract SB and thereby uploads the proof of solution P to the smart contract SB stored on blockchain BC. At 505, the RegisterProofOfSolution function timestamps the registration of the proof of solution P on the blockchain BC and sends a confirmation of ownership of the proof of solution P to Solver SL.

Figure 6:
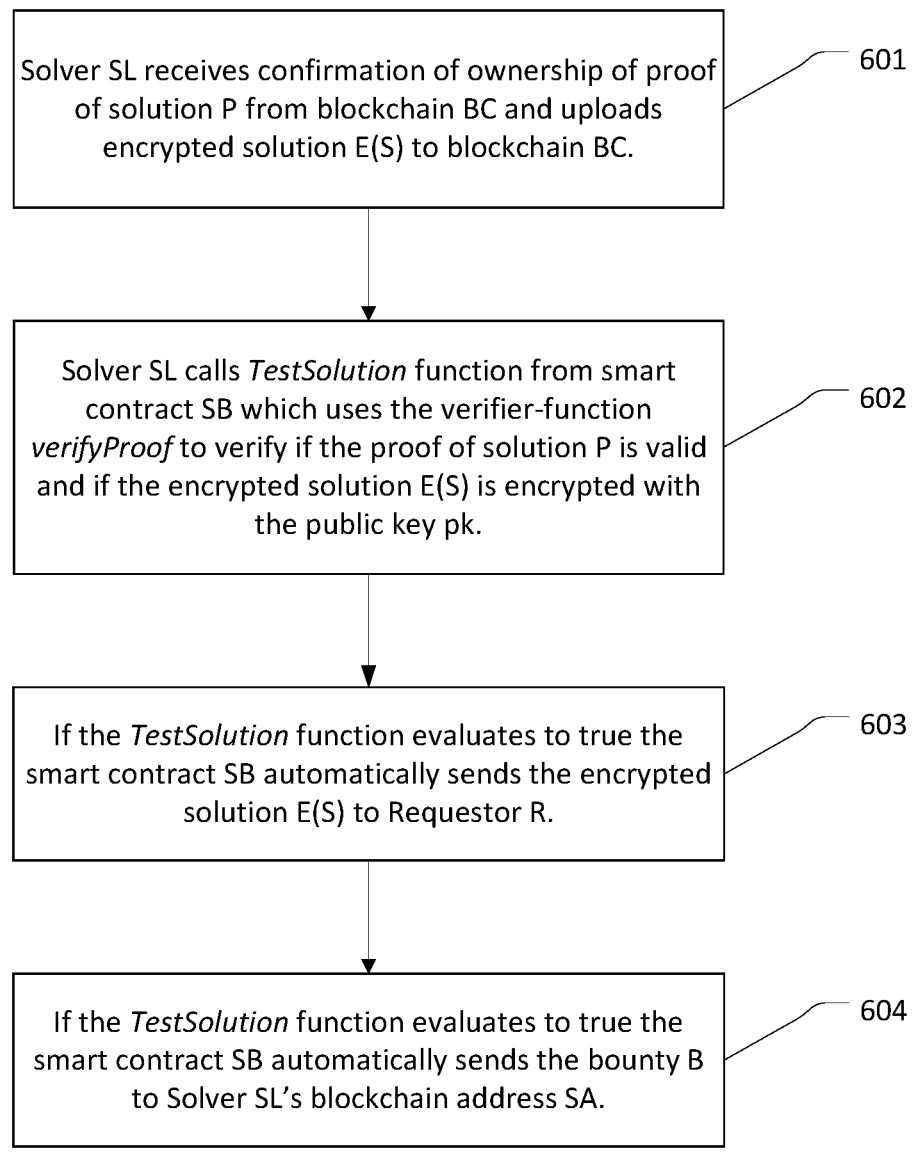
FIG. 6 shows a flow diagram visualizing a method of a smart contract SB with a zkSNARK object ZK verifying a solution S to a problem Z and automatically delivering the bounty B and the solution S, respectively (203 in FIG. 2)

FIG. 6 shows a flow diagram visualizing a method of a smart contract SB with a zkSNARK verifying a solution S to a problem statement Z and automatically delivering the bounty B and the solution S, respectively (203 in FIG. 2). At 601, a Solver SL receives the confirmation of ownership of the proof of solution P from the blockchain BC that his proof of solution was included into the blockchain and uploads the encrypted solution E(S) to the blockchain BC. At 602, the Solver SL calls a TestSolution function from the smart contract SB which uses the verifier-function verifyProof to verify if the proof of solution P is valid and if the encrypted solution E(S) is encrypted with the public key pk. At 603, if the TestSolution function evaluates to true the smart contract SB automatically sends the encrypted solution E(S) to the Requestor R. At 604, if the TestSolution function evaluates to true the smart contract SB automatically sends the bounty B to the Solver SL's blockchain address SA.

3. Extensions 3.1 Early Cancelling

The Requestor, being the one creating the trusted setup, is in principal able to cancel his own contract by creating a fake proof and uploading the corresponding dummy pseudo-cyphertext he used for creating it. This, however, is not undermining the concept described in the embodiments in any significant way because it is mitigated by the fact that such early cancelling would negatively affect the Requestor's reputation as he is the only one able to do early cancelling. Another way for the Requestor to prove his good faith is to actually share the solution for everyone to be able to check it independently of the zkSNARK scheme. In this regard, the presented protocol has no exclusivity in the agreement between the parties.

3.2 Automatic Best Solution Selection

In the embodiments above, once a Solver SL has submitted a correct solution, the bounty B is released and the smart contract SB ends. According to an alternative embodiment, multiple proofs can be submitted until the deadline and the proofs of solutions P are accompanied by a score over which solutions are ranked. When the deadline passes, a period of solution upload is opened and all submitters can upload their best solution. Upon closing of the solution upload period, the bounty is automatically paid to the contestant with the best validated solution.

According to this embodiment, Requestor R loses the ability to cancel the contract after at least one valid solution has been submitted.

The following sub-variants can by implemented: According to an alternative embodiment, a timed contest is made. When valid solutions to the problem can have varying quality, the smart contract is made to accept multiple proof of solutions annotated with a quality score. The zkSNARK is suitably enhanced to allow a score as a public input and test it against the performance of the solution.

According to yet an alternative embodiment, an auction-style pricing scheme is applied. Submissions also include a price that the Solver would be happy with charging. The cheapest solution wins The Requestor can simultaneously ask the contract to refund him the difference.

3.3 Parametric Bounties Services

If the bounty is made of real currency and solving the problem is deemed profitable and if the smart contract actually implements a series of smart bounties as proposed below, an auxiliary application provided to Solvers SL could expose an application programming interface (API) that would enable the automation of the derivation of a solution (e.g. selection of a protein and finding of a stable configuration) by an artificial intelligence (AI). This would effectively lead to the outsourcing of the computational problem of finding such configurations.

The smart bounty idea is equivalent to making a request for a proposal by a solution provider according to a set of requirements. The Requestor needs a new asset with certain fuctionalities and the Solver offers it as a product. This variation can be seen as a pay-per-request service model.

In this version, a party, say the Facilitator, identifies a recurrent problem with a set of well-defined acceptance tests which don't have a generic closed form but rather take input parameters. Therefore, if those requirements can be formulated within a zero-knowledge scheme (such as zkSNARK), they will accept the corresponding input parameters. For instance, the travelling salesman problem can be solved for a set of coordinates to visit, but there is no generic solution for any set of coordinates. A zkSNARK could be compiled to accept a set of coordinates to visit as public inputs and either a target cost (provided by the Requestor), or the corresponding solution cost (to be used to select the best solution in a timed contest setup). Using this zkSNARK, it would then be possible to setup a smart contract to which a series of Requestors could submit specific public inputs defining the acceptance tests of the problem for which they would pay a certain bounty to get the solution.

According to this embodiment, the smart contract serves as a platform to submit input-specific requests for solutions and their corresponding solutions. The settlement of individual requests are handled as for the standard case, but public inputs, bounties, proofs, and solutions form a stream of smart bounties. Solvers are able to decide whether to answer only one setup of the problem, or invest in an optimized way of solving the generic problem in order to lower the cost of finding individual solutions.

To further incentivize Solvers to invest in efficient solvers for a given parametric problem, a Requestor can pledge a total amount of money to the smart contract that will have to be used for multiple bounties. That guarantees a certain volume for the market, for a specific period, which Solvers can then target more strategically. If the pledged amount is not spent before the end of its validity, the contract could work with a combination of redistribution of this amount to past solvers and extension of the pledge period.

The standard smart bounty contract methods behave essentially in the same way as they work in the embodiments described above, with the exception that they are specific to specific bounties. Bounties can be defined either as a set of inputs, or as a set of (inputs, Requestor public key). The smart contract is complemented with the following methods:

Pledge:
Function Pledge accepts an amount and date. The amount is blocked until the pledge date, in an account specific to the Requestor and from which individual bounties will be taken.

SubmitBounty:
SubmitBounty accepts a bounty amount (blocked in the smart contract from the Requestor's pledge account), a duration of validity, a public key (for solution encryption), and a set of public inputs for the zkSNARK. This method puts this new bounty in the smart contract ledger, GetBounties:
GetBounties accepts a status flag (open, solved and settled, or closed without solution). Returns a list of bounties filtered on their status.

ShutDown:
ShutDown deactivates the SubmitBounty function.

In this setup, there are potentially multiple Requestors and multiple Solvers interacting through the platform, and the Facilitator is a third party, but he cannot interfere in the settlement of individual bounties. He can however ensure that a fee is automatically paid to him whenever a bounty is submitted or settled.

3.4 Off-Chain Storage of Large Solutions

Figure 7A:
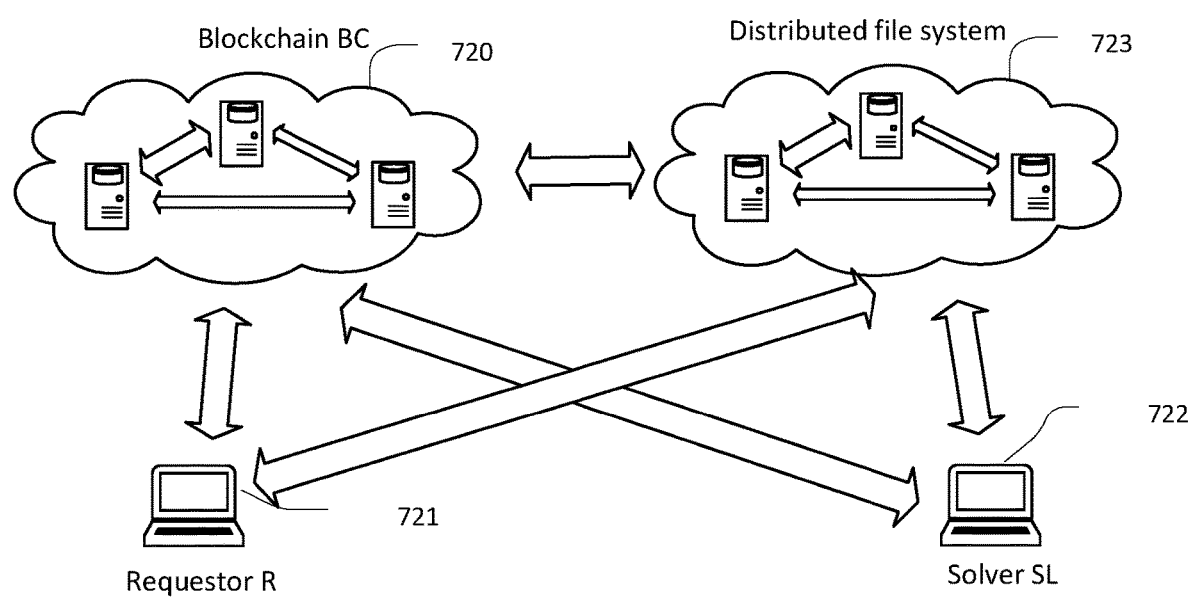
FIG. 7a describes an example of a system that is configured to host a smart contract for requesting solutions to a problem, verifying an answer and automating pay-out and a distributed file system, e.g. IPFS, where a solution might be stored.

FIG. 7a describes an example of a system that is configured to host a smart contract for requesting solutions to a problem, verifying an answer and automating pay-out and a distributed file system, e.g. IPFS, where a solution might be stored. The system comprises a distributed computation platform 720 which hosts a blockchain BC, a first client computer 721 which is operated by a Requestor R, who intends to outsource a certain task, and a second client computer 722 which is operated by a Solver SL, who intends to provide a solution to the task and a distributed file system 723, e.g. a IPFS, where large data can be stored in a distributed way. The distributed computation platform 101, the first client computer 102, and the second client computer 103 and the distributed file system are interconnected by means of a computer network, e.g. the Internet, local area networks (LAN), UMTS/LTE, or the like.

zkSNARK proofs are succint and quick to verify regardless of the size of the computation or secret inputs. However, if the (encrypted) solution is large, including it in a blockchain transaction may be expensive or even impossible.

To avoid this, the embodiment described below uses a distributed file system to exchange the (encrypted) solution.

Several public distributed file systems exist which allow a file to be requested from the network via a hash of its contents (e.g., IPFS, BitTorrent). According to the embodiment, a Solver replaces the encrypted solution in his submission with its hash. The zero-knowledge proof scheme (e.g. zkSNARK) implemented in the smart contract on the blockchain checks for correct encryption of the solution and correct hashing of the resulting ciphertext. The Requestor then obtains the solution through the off-blockchain distributed filesystem. The main challenge here is to avoid the Solver submitting a valid hash, getting a bounty, and then the Requestor discovering that no file with that hash is available in the distributed filesystem. To prevent this the protocol includes a second zero-knowledge proof mechanism.

The double zero-knowledge proof mechanism works as follows:

1. The Requestor R starts by setting up the problem statement Z, which in the present embodiment comprises the preparation of two zkSNARK objects, here ZK1 and ZK2: ZK1 is configured to verify that an encrypted solution is shared offchain and the second object ZK2 is configured to prove that the Requestor R is able to decrypt the encrypted solution E(S).

2. The Solver SL first encrypts (with symmetric encryption) the solution S with an (ephemeral) symmetric key ks ("solution encryption key") of his choosing to obtain a encrypted solution E(ks,S). Solver SL then hashes that result to obtain a hash value H(E(ks,S)), whereby the hash value is used to identify files on peer-to-peer filesharing networks. The first zkSNARK ZK1 is used to produce a proof of solution P1 that proves that the Solver SL possesses the encryption key ks and that the solution E(ks,S) has been correctly encrypted and hashed. It takes as public input the hash value H(E(ks,S)) of the encrypted solution E(ks,S), and as private input the encrypted solution E(ks,S) and the Solver's encryption key ks. The Solver SL generates a first proof of solution P1 using the first zkSNARK object ZK1 and submits the hash value H(E(ks,S)), which identifies the address of the stored encrypted solution E(ks,S) on the distributed file system, and proof P1 to the smart contract on the blockchain.

3. The smart contract SB doesn't immediately pay a bounty B on submission of a valid solution S. Instead, it notes this first submission of the hash value H(E(ks,S)) and proof of solution P1 and gives the Requestor R time to fetch the encrypted solution E(ks,S) using the submitted hash value H(E(ks,S)).

4. If the Requestor R successfully obtains the encrypted solution E(ks,S) (which he cannot yet decrypt at this point, lacking the symmenic key ks) from the distributed file system, he calls a function of the smart contract requesting the upload of the Solver's encryption key. The smart contract SB only accepts this request, if this request was issued by the Requestor R., e.g., by checking the sender address of the associated block chain transaction.

5. The second zkSNARK object ZK2 is used by Solver SL to generate a second proof of solution P2 that proves that the Requestor R is able to decrypt the encrypted solution E(ks,S). The Solver SL then uploads the solution encryption key E(pk,ks) encrypted with the Requestor's public key pk together with the second proof of solution P2 using the second zkSNARK object ZK2 into the smart contract on the blockchain. The second zkSNARK object ZK2 takes the hashed, encrypted solution, the encrypted key, and the Requestor's public key as public inputs. ZK2 comprises a verification function that takes the proof P2, encrypted solution E(ks,S) and the solution encryption key ks as private inputs. The second zkSNARK object ZK2 (more specifically the verifyProof function of the zkSNARK object ZK2) certifies that the Solution S is correct, that is was encrypted with the solution encryption key ks, that the result was correctly hashed and uploaded on the distributed file system, and that the solution encryption key ks was encrypted with the Requestor's public key pk.

6. Once that all the above is proven, the Requestor R has access to the solution S and the smart contract releases the bounty B.

Figure 7B:
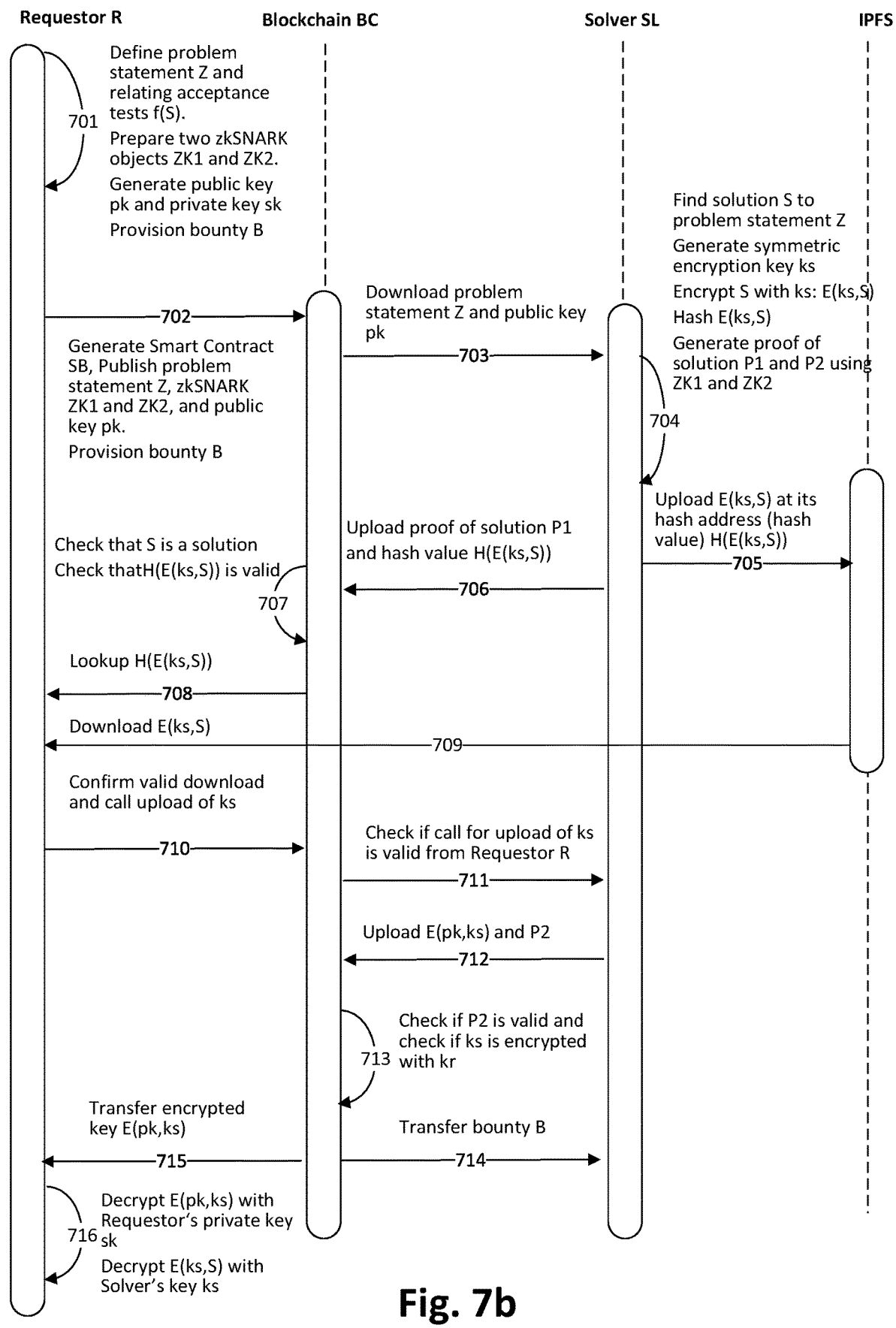
FIG. 7b shows in more detail an embodiment of a modified protocol where a Solvers SL stores the a solution S to the problem Z on a distributed file system, e.g. IPFS.

FIG. 7b shows communication flows of this modified protocol where a Solvers SL stores a solution S to the problem Z on a distributed file system. At 701, the Requestor R defines a computer readable problem statement Z and converts acceptance tests related to the problem statement Z. Further, Requestor R prepares two zkSNARK objects, here ZK1 and ZK2: ZK1 is configured to verify that an encrypted solution is shared offchain, the second zkSNARK object ZK2 is configured to prove that the Requestor R is able to decrypt the encrypted solution E(S). Further Requestor R generates a keypair comprising a public key pk and a private key sk, and provisions a bounty B. At 702, the Requestor R publishes the problem statement Z, the two zkSNARK objects ZK1 and ZK2, public key pk and provisioned bounty B on a blockchain BC. At 703, a Solver SL downloads the problem statement Z and the public key pk from the blockchain. At 704, the Solver SL finds a solution to the problem statement Z, and generates a symmetric key ks. The Solver SL encrypts (with symmetric encryption) the solution S with an (ephemeral) symmetric key ks of his choosing to obtain an encrypted solution E(ks,S). Further, the Solver SL hashes the encrypted solution E(ks,S) to obtain the hash value H(E(ks,S)). Further, the Solver SL generates a proof of solution P1 using the first zkSNARK ZK1 to prove that the encrypted solution is shared offchain and a second a proof of solution P2 using a second zkSNARK ZK2 to prove that the Requestor R is able to decrypt the encrypted the encrypted solution E(ks,S). At 705, the encrypted solution E(ks,S) is uploaded and stored at an distributed file system (e.g. IPFS), whereby the hash value H(E(ks,S)) serves as an unique identifier for the stored data, i.e. E(ks,S) At 706, the hash value H(E(ks,S)) and the first proof of solution P1 are uploaded to smart contract SB on blockchain BC. At 707, the smart contracts SB verifies if S is a valid solution and if the hash value H(E(ks,S)) is valid, i.e. if it is the correct hash address where the encrypted solution E(ks,S) is stored. At 708, the Requestor looks up the hash value H(E(ks,S)). At 709, the Requestor R downloads the encrypted solution E(ks,S) using the hash value H(E(ks,S)) At 710, the Requestor R confirms the valid download of E(ks,S) and calls a function which opens the upload of the Solver's encryption key ks. At 711, the smart contract SB checks if the call is valid, i.e. if the call is coming from Requester R, and if valid calls for the upload of ks from the Solver SL. At 712, the Solver SL uploads his private key ks encrypted by the public key pk, i.e. E(ks,S) and the second proof of solution P2 to the blockchain BC. At 713, the smart contract SB checks if the second proof of solution P2 is valid and if the private key ks was encrypted with public key pk. At 714, if the validation at 713 succeeded, the bounty B is transferred to the Solver SL. At 715, if the validation at 713 has succeeded, the encrypted key E(ks,S) is transferred to the Requester R. At 716, the Requestor R decrypts E(ks,S) with his private key sk and then decrypts E(ks,S) with the Solver's symmetric key ks.

In an alternative embodiment may be the Requester R could require double encryption of the solution S to secure the solution S against the unintentional leakage of the Solver's key ks. Therefore, the solution may be doubly-encrypted. Therefore, the Solver SL first encrypts (with symmetric encryption) the solution S with an (ephemeral) symmetric key ks of his choosing to obtain an encrypted solution E(ks,S). Solver SL then encrypts the result E(ks,S) with the Requestor's public key pk to obtain a doubly-encrypted solution E(pk,E(ks,S)). Further, the Solver SL hashes the doubly-encrypted solution E(pk,E(ks,S)) to obtain the hash value H(E(pk,E(ks,S)). The other steps may be the same like explained above.

The embodiment described above relates to storing encrypted solutions on a distributed filesystem. In alternative embodiments, however, a standard fileserver could be used for storing encrypted solutions, whereby the file location should be a hash of the data itself. The principles described above would remain the same. The requirement that the file location is a hash of the data itself ensures that the downloaded data corresponds to the Hash value. If the encrypted solution is too big to be put on the blockchain, the hash version may represent it in the solution verification step. In this regard it is important that the hash value is trustlessly related to the data obtained on the file system. In other word, the particular property of the IPFS to store files at an address constituted of their hash is a trustless component that allows to achieve a trustless setup.

4. Implementation

Figure 8:
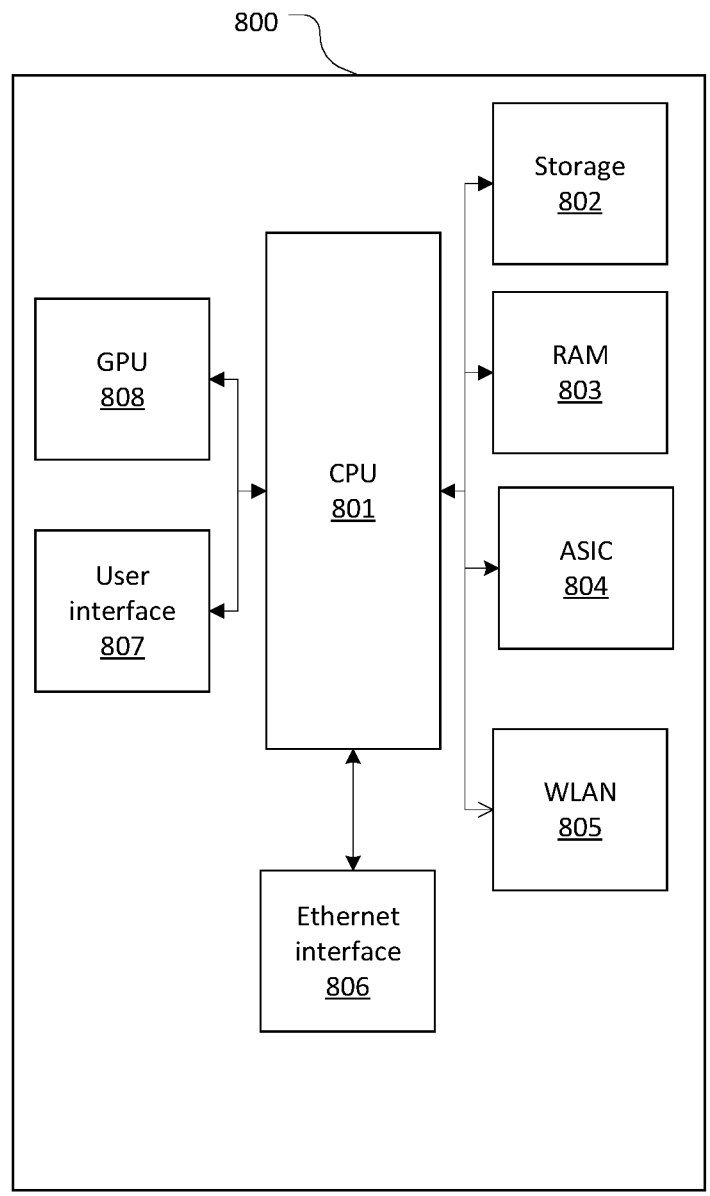
FIG. 8 schematically describes an embodiment of an electronic device which may implement the functionality of the Requestor's or the Solver's client computer or the functionality of a computer within a blockchain system.

FIG. 8 schematically describes an embodiment of an electronic device which may implement the functionality of the Requester's or the Solver's client computer or the functionality of a computer within a blockchain system. The electronic device may further implement a process of generating a zkSNARK object ZK. The electronic device 800 may be the client computer used by the Requestor R or the Solver SL. Further the electronic device may be a computer participating in the blockchain BC. The electronic device 800 comprises a CPU 801 as processor, a GPU as graphics processing unit 808 and an Ethernet interface 806 that may be connected to a router in order for the Requester R or the Solver SL to communicate with the blockchain BC via interact connection. The electronic device, if used as node of the blockchain BC may further comprise an ASIC (Application-specific integrated circuit) unit specially designed to solve potential mining computation in the blockchain BC efficiently.

The electronic device 800 further comprises a data storage 802 and a data memory 803 (here a RAM). The data memory 803 is arranged to temporarily store or cache data or computer instructions for processing by the processor 801. The data storage 1102 is arranged as a long term storage, e.g., for recording the blockchain BC.

It should be noted that the description above is only an example configuration. Alternative configurations may be implemented with additional or other sensors, storage devices, interfaces, or the like.

A blockchain may constitute a decentralized database which stores a growing list of blockchain records, called blocks, which are linked using cryptography. Each block typically contains a cryptographic hash of the previous block, a timestamp, and transaction data. Multiple transactions are typically stored in a single block. A blockchain can be used for example as an open distributed ledger, where the blockchain is typically managed by a peer-to-peer network collectively adhering to a protocol for inter-node communication and creating and validating new blocks. Preferably, once recorded, the data in any given block cannot be altered retroactively without alteration of all subsequent blocks, which would require consensus of the network majority (51% attack). The data is stored into blocks and the protocol by which a participating peer in the network can create a new block and the other peers validate this new block, i.e. the consensus mechanism, can be implemented for example as a proof-of-work protocol. This proof-of-work protocol can for example included finding a valid hash for the block to be included into the blockchain whereas this hash has to have a certain given structure. Finding a hash of the block with this given structure, i.e. intentionally producing a hash collision, can just be achieved by using brute force computing power and this process is often called mining. The mining computation may be efficiently done by using a mining-specific ASIC (see unit 805 in FIG. 8). The peer within the blockchain network that solves this mining computation first of all is allowed to include the block into the blockchain and may be rewarded for solving the mining computation.

Decentralized consensus within the blockchain network may then be reached, by every peer checking if the founded hash is valid and then always accepting the longest chain of valid blocks as the currently valid blockchain. The embodiments are, however, not restricted to a particular blockchain technology, in particular not to a particular consensus model. Other consensus principles than proof-of-work may be used to implement a blockchain.

It should be recognized that the embodiments describe methods with an exemplary ordering of method steps. The specific ordering of method steps is, however, given for illustrative purposes only and should not be construed as binding. For example steps 402 and 403 in FIG. 4, and/or steps 603 and 604 and 604 in FIG. 6 could be exchanged.

It should also be noted that the division of the electronic device of FIG. 8 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided, are envisaged as aspects of the present disclosure.

Note that the present technology can also be configured as described below:

(1) A system comprising a distributed ledger (BC) configured to store a smart contract (SB) related to a problem statement (Z), the smart contract (SB) enabling a zero-knowledge proof (ZK) concerning the problem statement (Z).

(2) The system of (1), wherein the distributed ledger (BC) is configured to receive a putative solution (S) to a problem statement (Z), and to verify the putative solution (S) to the problem statement (Z) using the zero-knowledge proof (ZK).

(3) The system of (1) or (2), wherein the zero-knowledge proof (ZK) is based on a validation function (f(S)) which takes a putative solution (S) and returns a score that represents the quality of the putative solution (S).

(4). The system of (3), wherein the zero-knowledge proof (ZK) is generated based on a computation object (C(f, $\vec{x}$, $\vec{y}$)) which is based on the validation function (f(S)).

(5) The system of anyone of (1) to (4), wherein the zero-knowledge proof (ZK) is implemented using a zkSNARK scheme.

(6) The system of anyone of (1) to (5), wherein the distributed ledger (BC) is implemented as a blockchain.

(7) The system of anyone of (1) to (6), wherein the zero-knowledge proof (ZK) defines a function (verifyProof) configured to verify a proof of solution (P).

(8) The system of anyone of (1) to (7), wherein the zero-knowledge proof (ZK) defines a function (buildProof) configured to build a proof of solution (P) according to the zero-knowledge proof (ZK).

(9) The system of claim anyone of (1) to (8), wherein the smart contract (SB) defines a function (Initialize) which is configured to be called on smart contract creation by a Requestor (R).

(10) The system of anyone of (9), wherein the function (Initialize) is configured to record a timestamp after which no further solutions will be accepted by smart contract (SB) and before which Requestor (R) cannot withdraw a bounty (B).

(11) The system of (10), wherein the smart contract (SB) defines a function (Cancel) which is configured to be called only by a Requestor (R), and only after the deadline set by the initialize function has passed and no valid solution has been submitted.

(12) The system of anyone of (1) to (11), wherein the smart contract (SB) defines a function (RegisterProofOfSolution) which is configured to accept a proof of solution (P).

(13) The system of anyone of (1) to (12), wherein the function (RegisterProofOfSolution) is configured to timestamp the received proof of solution (P) in order to record the time and date of receipt of the proof of solution (P).

(14) The system of anyone of (1) to (13), wherein the smart contract (SB) defines a function (TestSolution) which is configured to accept an encrypted solution (E(S)) as payload.

(15) The system of (14), wherein the function (TestSolution) is con ed to run a verifier function (verifyProof) against a proof of solution (P).

(16) The system of (14) or (15), wherein the function (TestSolution) is configured to, if the verification result is positive, automatically transfer a bounty (B) to the address of the function-caller, and to provide an encrypted solution (E(S)) to Requestor (R).

(17) The system of anyone of (1) to (16), wherein the smart contract (SB) defines a function (ChangeKeys) which is configured to accept a new public key (pk) from Requestor (R) which replaces the previous public key (pk).

(18) The system of anyone of (1) to (17), wherein the distributed ledger (BC) is configured to receive from a Requestor (R) a problem statement (Z).

(19) The system of anyone of (1) to (18), wherein the distributed ledger (BC) is configured to manage a bounty (B) related to the problem statement (Z).

(20) The system of anyone of (1) to (19), wherein the distributed ledger (BC) is configured to manage the bounty (B) in the form of cryptocurrency.

(21) The system of anyone of (1) to (20), wherein the smart contract (SB) defines a function (FetchAuxiliaryData) configured to provide a proof-generating software to Solvers (SL).

(22) The system of anyone of (1) to (21), wherein the smart contract (SB) defines a function (FetchAuxiliaryData) configured to provide an auxiliary application to Solvers (SL) which is configured to help a Solver (SL) to find an optimal solution (S) to the problem statement (Z).

(23) The system of anyone of (1) to (22), wherein the smart contract (SB) defines a function (FetchAuxiliaryData) configured to provide auxiliary data available from the smart contract, such as the problem statement Z, a Requestor's public key (pk), a proving key, and/or functionality to build a proof.

(24) The system of anyone of (1) to (23), wherein the smart contract (SB) includes a URL linking to a human- or machine-readable description of the problem statement (Z), a package containing an accompanying proof-generating software, a proving key, and/or a auxiliary application provided by Requestor (R).

(25) The system of anyone of (1) to (24), further comprising a distributed file system (IPFS) for storing a solution to the problem statement (Z).

(26) The system of anyone of (1) to (25), wherein the smart contract (SB) defines a function (Pledge) which accepts an amount and date. The amount is blocked until the pledge date, in an account specific to the Requestor and from which individual bounties will be taken.

(27) The system of anyone of (1) to (26), wherein the smart contract (SB) defines a function (SubmitBounty) which accepts a bounty amount, a duration of validity, a public key, and a set of public inputs for a zero-knowledge proof.

(28) The system of anyone of (1) to (27), wherein the smart contract (SB) defines a function (GetBounties) which accepts status information and which returns a list of bounties filtered on their status information.

(29) The system of anyone of (1) to (28), wherein the smart contract (SB) defines a function (ShutDown) which deactivates the function (SubmitBounty) for submitting a bounty.

(30) A computer-implemented method comprising a Requestor (R) requesting solutions (S) to a problem statement (Z), and a distributed ledger (BC) verifying a putative solution (S) to the problem statement (Z) provided by a Solver (SL) using a zero-knowledge proof (ZK).

(31) The computer-implemented method of (30), comprising the Requestor (R) setting up, for the problem statement (Z), a smart contract (SB) containing the zero-knowledge proof (ZK) for the problem statement (Z).

(32) The computer-implemented method of (30) or (31), comprising the Requestor (R) defining a problem through a set of requirements.

(33) The computer-implemented method of anyone of (30) to (32), comprising the Requestor (R) defining a validation function (f(S)) which takes a putative solution (S) and returns a score that represents the quality of the putative solution (S).

(34) The computer-implemented method of anyone of (30) to (33), comprising the Requestor (R) preparing a computation object ($C(f, \vec{x}, \vec{y})$) which is based on a validation function (f(S)) which takes a putative solution (S) and returns a score that represents the quality of the putative solution (S).

(35) The computer-implemented method of anyone of (30) to (34), comprising building a zero-knowledge proof (ZK) based on a validation function (f(S)) which takes a putative solution (S) and returns a score that represents the quality of the putative solution (S).

(36) The computer-implemented method of anyone of (30) to (35), comprising building a zero-knowledge proof (ZK) which comprises a function (buildProof) configured to build a proof of solution (P) and a function (verifyProof) configured to verify a proof of solution (P).

(37) The computer-implemented method of anyone of (30) to (36), comprising providing a proof-generating software to Solvers (SL).

(38) The computer-implemented method of anyone of (30) to (37), comprising providing an auxiliary application to Solvers (SL) which is configured to help a Solver (SL) to find an optimal solution (S) to the problem statement (Z).

(39) The computer-implemented method of anyone of (30) to (38), the method providing a function (Initialize) which is configured to be called on smart contract creation by Requestor (R).

(40) The computer-implemented method of (39), wherein the function (Initialize) is configured to record a timestamp after which no further solutions will be accepted by smart contract (SB) and before which Requestor (R) cannot withdraw a bounty (B).

(41) The computer-implemented method of claim (39) or (40), the method further providing a function (Cancel) which is configured to be called only by the Requestor (R), and only after the deadline set by the initialize function has passed and no valid solution has been submitted.

(42) The computer-implemented method of anyone of (30) to (41), the method providing a function (RegisterProofOfSolution) which is configured to accept a proof of solution (P).

(43) The computer-implemented method of (42), wherein the function (RegisterProofOfSolution) is configured to timestamp the received proof of solution (P) in order to record the time and date of receipt of the proof of solution (P).

(44) The computer-implemented method of anyone of (30) to (43), the method providing a function (TestSolution) which is configured to accept an encrypted solution (E(S)) as payload.

(45) The computer-implemented method of (44), wherein the function (TestSolution) is configured to run a verifier function (verifyProof) against a proof of solution (P).

(46) The computer-implemented method of (44) or (45), wherein the function (TestSolution) is configured to, if the verification result is positive, automatically transfer a bounty (B) to the address of the function-caller, and to provide an encrypted solution (E(S)) to Requestor (R).

(47) The computer-implemented method of anyone of (30) to (46), the method providing a function (ChangeKeys) which is configured to accept a new public key (pk) from Requestor (R) which replaces the previous public key (pk).

(48) The computer-implemented method of anyone of (30) to (47), comprising the Requestor (R) defining a problem statement (Z).

(49) The computer-implemented method of anyone of (30) to (48), comprising the Requestor (R) defining a bounty (B) related to the problem statement (Z).

(50) The computer-implemented method of (49), comprising the Requestor (R) transferring the bounty (B) in the form of cryptocurrency

(51) The computer-implemented method of anyone of (30) to (50), comprising the Requester publishing the problem statement (Z).

(52) The computer-implemented method of anyone of (30) to (51), wherein the zero-knowledge proof (ZK) is implemented using a zkSNARK scheme.

(53) The computer-implemented method of anyone of (30) to (52), wherein the distributed ledger (BC) is implemented as a blockchain.

(54) The computer-implemented method of anyone of (30) to (53), wherein the smart contract (SB) defines a function (FetchAuxiliaryData) configured to provide a proof-generating software to Solvers (SL).

(55) The computer-implemented method of anyone of (30) to (54), wherein the smart contract (SB) defines a function (FetchAuxiliaryData) configured to provide an auxiliary application to Solvers (SL) which is configured to help a Solver (SL) to find an optimal solution (S) to the problem statement (Z).

(56) The computer-implemented method of anyone of (30) to (55), wherein the smart contract (SB) defines a function (FetchAuxiliaryData) configured to provide auxiliary data available from the smart contract, such as the problem statement Z, a Requestor's public key (pk), a proving key, and/or functionality to build a proof.

(57) The computer-implemented method of anyone of (30) to (56), wherein the smart contract (SB) includes a URL linking to a human- or machine-readable description of the problem statement (Z), a package containing an accompanying proof-generating software, a proving key, and/or a auxiliary application provided by Requestor (R).

(58) The computer-implemented method of anyone of (30) to (57), further comprising storing a solution to the problem statement (Z) on a distributed file system (IPFS).

(59) The computer-implemented method of anyone of (30) to (58), further comprising the requester (R) pledging, to the smart contract (SB), a total amount of money that is used for multiple bounties (B).

(60) The computer-implemented method of anyone of (30) to (59), further comprising setting up, by a Facilitator, a smart contract (SB) that defines a parameter dependent template of a problem.

(61) The computer-implemented method of anyone of (30) to (60), further comprising providing a function (Pledge) which accepts an-amount and date. The amount is blocked until the pledge date, in an account specific to the Requestor and from which individual bounties will be taken;

(62) The computer-implemented method of anyone of (30) to (61), further comprising providing a function (SubmitBounty) which accepts a bounty amount, a duration of validity, a public key, and a set of public inputs for a zero-knowledge proof.

(63) The computer-implemented method of anyone of (30) to (62), further comprising providing a function (GetBounties) which accepts status information and which returns a list of bounties filtered on their status information.

(64) The computer-implemented method of anyone of (30) to (63), further comprising providing a function (ShutDown) which deactivates the function (SubmitBounty) for submitting a bounty.

(65) An electronic device (102) comprising circuitry configured to implement a zero knowledge scheme (ZK) in a smart contract (SB) and to store the smart contract (SB) on a distributed ledger (BC).

(66) An electronic device (103) comprising circuitry configured to create a proof of solution (P) from a solution (S) to a problem statement (Z) using a zero knowledge scheme (ZK) implemented in a smart contract (SB) stored on a distributed ledger (BC).

(67) A system comprising a distributed ledger (BC) configured to store a smart contract (SB) related to a problem statement (Z), the smart contract (SB) enabling a sharing of a solution (S) related to the problem statement (Z),

(68) A computer-implemented method comprising a Requestor (R) requesting solutions (S) to a problem statement (Z), and a distributed ledger (BC) verifying a putative solution (S) to the problem statement (Z) provided by a Solver (SL).

The invention claimed is:
1. A system, comprising:
a distributed ledger stored on physical peer-to-peer network nodes having a smart contract related to a problem statement, the smart contract enabling a zero-knowledge proof concerning the problem statement,
wherein the zero-knowledge proof is based on a validation function which takes a putative solution and returns a score that represents the quality of the putative solution,
wherein the smart contract defines a function which is configured to be called on smart contract creation by a Requestor, wherein the function is configured to record a timestamp after which no further solutions will be accepted by smart contract and before which Requestor cannot withdraw a bounty.

2. The system of claim 1, wherein the distributed ledger is configured to receive a putative solution to a problem statement, and to verify the putative solution to the problem statement using the zero-knowledge proof.

3. The system of claim 1, wherein the zero-knowledge proof is generated based on a computation object which is based on the validation function.

4. The system of claim 1, wherein the zero-knowledge proof is implemented using a zkSNARK scheme.

5. The system of claim 1, wherein the distributed ledger is implemented as a blockchain.

6. The system of claim 1, wherein the zero-knowledge proof defines a function configured to verify a proof of solution.

7. The system of claim 1, wherein the zero-knowledge proof defines a function configured to build a proof of solution according to the zero-knowledge proof.

8. The system of claim 1,
wherein the smart contract defines a function which is configured to be called only by a Requestor, and only after the deadline set by the initialize function has passed and no valid solution has been submitted.

9. The system of claim 1, wherein the smart contract defines a function which is configured to accept a proof of solution.

10. The system of claim 9, wherein the function is configured to timestamp the received proof of solution in order to record the time and date of receipt of the proof of solution.

11. The system of claim 1 wherein the smart contract defines a function which is configured to accept an encrypted solution as payload.

12. The system of claim 11, wherein the function is configured to run a verifier function against a proof of solution, and wherein the function is configured to, if the verification result is positive, automatically transfer a bounty to the address of the function-caller, and to provide an encrypted solution to Requestor.

13. The system of claim 1 wherein the distributed ledger is configured to manage a bounty related to the problem statement or wherein the distributed ledger is configured to manage a bounty in the form of cryptocurrency.

14. The system of claim 1, wherein the smart contract defines
a function configured to provide a proof-generating software to Solvers; or
a function configured to provide an auxiliary application to Solvers which is configured to help a Solver to find an optimal solution to the problem statement; or
a function configured to provide auxiliary data available from the smart contract, such as the problem statement Z, a Requestor's public key, a proving key, and/or functionality to build a proof.

15. The system of claim 1, further comprising a distributed file system for storing a solution to the problem statement.

16. The system of claim 1, wherein the smart contract defines a function which accepts an amount and date; and/or a function which accepts a bounty amount, a duration of validity, a public key, and a set of public inputs for a zero-knowledge proof; and/or a function which accepts status information and which returns a list of bounties filtered on their status information; and/or a function which deactivates the function for submitting a bounty.

17. A computer-implemented method, comprising:

storing, by a distributed ledger. a smart contract related to a problem statement;

requesting, by a Requestor, solutions to the problem statements; and verifying, by the distributed ledger a putative solution to the problem statement provided by a Solver using a zero-knowledge proof, wherein the zero-knowledge proof is based on a validation function which takes a putative solution and returns a score that represents the quality of the putative solution; and defining, by the smart contract, a function which is configured to be called on smart contract creation by a Requestor, wherein the function is configured to record a timestamp after which no further solutions will be accepted by the smart contract and before which Requestor cannot withdraw a bounty.

18. An electronic device comprising circuitry configured to implement a zero knowledge scheme in a smart contract and to store the smart contract on a distributed ledger, wherein the smart contract enables a zero-knowledge proof concerning the problem statement, wherein the zero-knowledge proof is based on a validation function which takes a putative solution and returns a score that represents the quality of the putative solution, wherein the smart contract defines a function which is configured to be called on smart contract creation by a Requestor, wherein the function is configured to record a timestamp after which no further solutions will be accepted by the smart contract and before which Requestor cannot withdraw a bounty.

19. An electronic device comprising circuitry configured to create a proof of solution from a solution to a problem statement using a zeroknowledge proof implemented in a smart contract stored on a distributed ledger, wherein the zero-knowledge proof is based on a validation function which takes a putative solution and returns a score that represents the quality of the putative solution, wherein the smart contract defines a function which is configured to be called on smart contract creation by a Requestor, wherein the function is configured to record a timestamp after which no further solutions will be accepted by the smart contract and before which Requestor cannot withdraw a bounty.

* * * * *